US008444482B2

(12) United States Patent
Aoki et al.

(10) Patent No.: US 8,444,482 B2
(45) Date of Patent: May 21, 2013

(54) WAGERING GAME WITH DUAL-PLAY FEATURE

(75) Inventors: Dion K. Aoki, Henderson, NV (US); Benjamin T. Gomez, Chicago, IL (US); Joel R. Jaffe, Glenview, IL (US); Daniel Louie, Chicago, IL (US); Jamie W. Vann, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/180,250

(22) Filed: Jul. 11, 2011

(65) Prior Publication Data

US 2011/0312410 A1 Dec. 22, 2011

Related U.S. Application Data

(63) Continuation of application No. 12/678,640, filed as application No. PCT/US2008/079971 on Oct. 15, 2008.

(60) Provisional application No. 60/999,434, filed on Oct. 18, 2007.

(51) Int. Cl.
*A63F 13/00* (2006.01)
*A63F 13/10* (2006.01)

(52) U.S. Cl.
USPC .................. 463/25; 463/16; 463/20; 463/21; 463/42; 273/138.1; 273/139

(58) Field of Classification Search
USPC ........... 463/10–13, 16, 20–22, 25, 29, 40–42; 273/138.1, 139, 142 B, 142 A, 142 J, 148 A, 273/149 P, 149 R, 243, 292–293, 304, 306, 273/309
IPC ............................................ A63F 13/00,13/10
See application file for complete search history.

(56) References Cited

U.S. PATENT DOCUMENTS

| | | | |
|---|---|---|---|
| 4,621,814 | A | 11/1986 | Stepan et al. |
| 5,707,286 | A | 1/1998 | Carlson |

(Continued)

FOREIGN PATENT DOCUMENTS

| | | | |
|---|---|---|---|
| GB | 2148037 | A | 5/1985 |
| GB | 2149174 | | 6/1985 |

OTHER PUBLICATIONS

Written Opinion corresponding to co-pending International Patent Application Serial No. PCT/US2008/079971, United States Patent Office; dated Dec. 10, 2008; 6 pages.

(Continued)

*Primary Examiner* — Arthur O. Hall
(74) *Attorney, Agent, or Firm* — Nixon Peabody LLP

(57) ABSTRACT

Multi-player games that foster cooperation or competition between players. A multi-player wagering game system includes a first display to display a first wagering game; a first input device corresponding to the first display to accept input from a first player; a second display to display a second wagering game, the second display being adjacent to the first display; a second input device corresponding to the second display to accept input from a second player; and a bonus display to display a bonus game. The bonus game receiving input from both the first and the second input devices. Computer software causes the first wagering game and the second wagering game to be executed. A multi-person seating device is configured to permit the first player and the second player to sit side-by-side in front of the first display and the second display, respectively.

38 Claims, 19 Drawing Sheets

U.S. PATENT DOCUMENTS 6,142,872 A 11/2000 Walker et al.
6,210,274 B1 4/2001 Carlson
6,227,614 B1 5/2001 Rubin
6,254,481 B1 7/2001 Jaffe
6,272,223 B1 8/2001 Carlson
6,361,441 B1 3/2002 Walker et al.
6,428,413 B1 8/2002 Carlson
6,652,378 B2 * 11/2003 Cannon et al. .................. 463/20
6,712,699 B2 3/2004 Walker et al.
6,832,957 B2 12/2004 Falconer
6,837,788 B2 1/2005 Cannon
6,984,174 B2 * 1/2006 Cannon et al. .................. 463/25
6,986,055 B2 1/2006 Carlson
7,175,527 B2 2/2007 Bryant
7,364,510 B2 4/2008 Walker et al.
7,465,226 B2 * 12/2008 Ikeya et al. ..................... 463/16
7,758,416 B2 * 7/2010 Randall ........................... 463/20
2004/0209660 A1 10/2004 Carlson et al.
2005/0119042 A1 6/2005 Chamberlain et al.
2005/0193209 A1 9/2005 Saunders et al.
2005/0233794 A1 * 10/2005 Cannon et al. .................. 463/16
2006/0052160 A1 3/2006 Saffari et al.
2006/0205468 A1 9/2006 Saffari et al.
2007/0026936 A1 * 2/2007 Gatto et al. ..................... 463/25
2007/0077994 A1 4/2007 Betteridge
2007/0218968 A1 9/2007 Snow et al.

OTHER PUBLICATIONS

International Search Report corresponding to co-pending International Patent Application Serial No. PCT/US2008/079971, United States Patent Office; dated Dec. 10, 2008; 2 pages.

* cited by examiner

WAGERING GAME WITH DUAL-PLAY FEATURE

CROSS-REFERENCE TO RELATED APPLICATIONS

This application is a Continuation of U.S. application Ser. No. 12/678,640, filed Mar. 17, 2010, which is a U.S. National Stage of International Application No. PCT/US2008/079971, filed Oct. 15, 2008, which claims the benefit of U.S. Provisional Application No. 60/999,434, filed on Oct. 18, 2007, both of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to multi-player gaming.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines Because the bonus game concept offers tremendous advantages in player appeal and excitement relative to other known games, and because such games are attractive to both players and operators, there is a continuing need to develop gaming machines with new types of bonus games to satisfy the demands of players and operators.

Traditional wagering games incentivize a player to maximize his or her own winnings, and emphasis is placed on appealing to the player's sense of self-gain. Even in tournament-style wagering games, each tournament player seeks to maximize his or her own winnings to the detriment of the other tournament players. Aspects disclosed herein address this and other related needs.

SUMMARY OF THE INVENTION

According to an aspect of the present invention, a multi-player wagering game method includes receiving at a first gaming module a first wager from a first player; receiving at a second gaming module a second wager from a second player; receiving a first input from the first player indicative of a minor-play selection; configuring the first gaming module and the second gaming module for a mirror-play session, the first gaming module and the second gaming module being linked such that information can be communicated between the first gaming module and the second gaming module, the first gaming module having an associated first credit meter and the second gaming module having an associated second credit meter; invoking the mirror-play session on the first gaming module and the second gaming module; initiating at either the first gaming module or the second gaming module, a round of a series of rounds; and for each round, randomly selecting a first game outcome from a plurality of game outcomes, displaying the first game outcome on the display of the first gaming module and the display of the second gaming module, and responsive to the first game outcome being a winning outcome, awarding a first award related to the first wager to the first player and a second award related to the second wager to the second player.

The method may further include providing a multi-player seating configuration, such that the first player and the second player are seated side-by-side in front of the first gaming module and the second gaming module.

The method may further include prompting the second player at the second gaming module to join the minor play session.

According to another an aspect of the present invention, a multi-player wagering game method includes receiving at a first gaming module a first wager from a first player; receiving at a second gaming module a second wager from a second player; receiving a first input from the first player indicative of a minor-play mode; configuring the first gaming module and the second gaming module for the mirror-play mode, the first gaming module and the second gaming module being linked such that information can be communicated between the first gaming module and the second gaming module, the first gaming module having an associated first credit meter and the second gaming module having an associated second credit meter; initiating a gaming session in the mirror-play mode on the first gaming module and the second gaming module; displaying a wagering game on a display of the first gaming module and a display of the second gaming module; randomly selecting a game outcome associated with the wagering game from a plurality of game outcomes; displaying the game outcome on the display of the first gaming module and the display of the second gaming module; responsive to the game outcome being a winning outcome, awarding a first award related to the first wager to the first player and a second award related to the second wager to the second player; and responsive to the game outcome being a bonus trigger, initiating a bonus round associated with the game outcome.

The bonus round may also include receiving a first bonus selection and a second bonus selection from the first and second players at the first and second gaming modules, respectively; and responsive to the first bonus selection or the second bonus selection yielding a bonus award, awarding the bonus award to the first player or the second player.

The method may further include providing a multi-player seating configuration, such that the first player and the second player are seated side-by-side in front of the first gaming module and the second gaming module.

The method may further include prompting the second player at the second gaming module to join the minor-play session.

According to another an aspect of the present invention, a multi-player wagering game method includes receiving at a first gaming module a first wager from a first player; receiving at a second gaming module a second wager from a second player; configuring the first gaming module and the second gaming module for a best-outcome mode, the first gaming module and the second gaming module being linked such that information can be communicated between the first gaming module and the second gaming module; displaying a first wagering game at the first gaming module and a second wagering game at the second gaming module; randomly selecting a first game outcome from a plurality of game outcomes associated with the first wagering game and a second game outcome from a plurality of game outcomes associated with the second wagering game; initiating play of the first wagering game by the first player at the first gaming module to display the first outcome; initiating, at approximately the same time as the initiating play of the first wagering game, play of the second wagering game at the second gaming module to display the second outcome; selecting a best outcome between the first and second game outcomes; responsive to the best outcome being a winning outcome, awarding a first award related to both the first wager and the best outcome to the first player and a second award related to both the second wager and the best outcome to the second player; and responsive to the best outcome being a bonus trigger, awarding a bonus to both the first player and the second player.

The awarding of the bonus may also include alternately receiving a first bonus selection and a second bonus selection from the first and second players at the first and second gaming modules, respectively.

Awarding the bonus may also include initiating play of a first bonus game for the first player to display a first bonus outcome, initiating play of a second bonus game for the second player to display a second bonus outcome, selecting a best bonus outcome between the first and second bonus game outcomes, and awarding a bonus award to both the first player and the second player related to the best bonus outcome.

Awarding the bonus may also include awarding a common bonus award to both the first player and the second player.

The method may further include providing a multi-player seating configuration, such that the first player and the second player are seated side-by-side in front of the first gaming module and the second gaming module.

The method may further include indicating to both players which outcome of the first outcome and the second outcome is associated with the bonus.

According to another an aspect of the present invention, a multi-player wagering game method includes providing a wagering game in which a first player and a second player compete for an award. The method also includes, for each play of a predetermined number of plays initiated by a first player at a first gaming module, randomly selecting a game outcome from a plurality of game outcomes and awarding one or more credits to the first player when the game outcome is a winning outcome. The method also includes, for each play of the predetermined number of plays initiated by a second player at a second gaming module, randomly selecting a game outcome from a plurality of game outcomes and awarding one or more credits to the second player when the game outcome is a winning outcome. The method also includes summing the credits resulting from the plays of the first gaming module to generate a first total, summing the credits resulting from the plays of the second gaming module to generate a second total, and awarding an award to the first player when the first total is greater than the second total. The method also includes receiving a side wager from the second player prior to the completion of the second plurality of plays and awarding an award to the second player when the first total is greater than the second total.

The method may also include, for each play of the predetermined number of plays initiated by the first player, receiving a first wager from the first player. For each play of the predetermined number of plays initiated by the second player, the method also includes receiving a second wager from the second player and increasing the second wager based on the side wager.

Receiving the side wager from the second player can be carried out prior to either player initiating a play.

The award to the second player can be the second total.

The award to the first player can be the sum of both the first total and the second total.

The method may also include providing a multi-player seating configuration, such that the first player and the second player are seated side-by-side in front of the first gaming module and the second gaming module.

The method may also include indicating to the first player a remaining number of plays based on the predetermined number of plays.

According to another an aspect of the present invention, a multi-player wagering game system includes a first display to display a first wagering game, a first input device corresponding to the first display to accept input from a first player, a second display to display a second wagering game, the second display being adjacent to the first display, a second input device corresponding to the second display to accept input from a second player, and a bonus display to display a bonus game, the bonus game receiving input from both the first and the second input devices. The system also includes computer software to cause the first wagering game and the second wagering game to be executed and a multi-person seating device configured to permit the first player and the second player to sit side-by-side in front of the first display and the second display, respectively.

The first display, the second display, and the bonus display can be integrated into a single terminal.

The seating device can include a bench seat dimensioned to accommodate two persons.

The seating device can include a pair of single person seats positioned immediately adjacent to one another.

The computer software can be configured to cause the first wagering game and the second wagering game to be executed independently of one another.

The software can be configured to accept an initiation input from the first input device indicating a desire to initiate a gaming session, display a prompt on the second display requesting that the second user join the gaming session, and accept a join input from the second input device.

The software can be configured to cause an outcome of the first wagering game to be displayed on the first display and an outcome of the second wagering game to be displayed on the second display when an input is received from the first input device.

The software can be configured to cause an award to be generated to the first player and the second player based on the outcome of the first wagering game.

An outcome of the first wagering game may cause the bonus game to be displayed on the bonus display.

The first display may include a first indicator to indicate that the first wagering game caused the bonus to be displayed and the second display may include a second indicator to indicate that the first wagering game caused the bonus to be displayed.

The first indicator may be a displayed arrow pointing in a downward direction and the second indicator may be a displayed arrow pointing in a side direction.

The software can be configured to accept an input from the first input device and display an identical outcome on both the first and second displays responsive to the input.

The software can be configured to generate separate awards for the first player and the second player corresponding to the outcome.

The software can be configured to accept from either the first input device or the second input device input causing the outcome to be displayed on both the first and second displays.

The software can be configured to accept from either the first input device or the second input device selections in the bonus game.

According to another an aspect of the present invention, a multi-player wagering game system includes a first display to display a first wagering game, a first input device corresponding to the first display to accept input from a first player, a second display to display a second wagering game, the second display being adjacent to the first display, a second input device corresponding to the second display to accept input from a second player, a first credit counter to count accumulated credits for the first player, a second credit counter to count accumulated credits for the second player, a first play counter to count a number of plays for the first player, and a second play counter to count a number of plays for the second player. The system also includes computer software to cause the first wagering game and the second wagering game to be executed and a multi-person seating device configured to permit the first player and the second player to sit side-by-side in front of the first display and the second display, respectively.

The software can be configured to, for each play for the first player, up to a predetermined number of plays, advance the first play counter by one, generate a randomly selected outcome for the first player, display the randomly selected outcome on the first display, and add to the first credit counter any credits associated with the randomly selected outcome. The software can also be configured to, for each play for the second player, up to the predetermined number of plays, advance the second play counter by one, generate a randomly selected outcome for the second player, display the randomly selected outcome for the second player on the second display, and add to the second credit counter any credits associated with the randomly selected outcome associated with the second player.

The software can be configured to compare the first credit counter with the second credit counter and to generate an award for the first player if the first credit counter exceeds the second credit counter or to generate an award for the second player if the second credit counter exceeds the first credit counter.

The software can be configured to receive a side wager from the first player and generate a side award for the first player if the first credit counter is less than the second credit counter.

The side award can be equal to the number of credits in the first credit counter.

The software can be configured to receive the side wager from the first player before a play by either the first player or the second player.

The software can be configured to, for each play for the first player, receive a first wager and generate an adjusted wager by adjusting the first wager by a factor related to the side wager. The software can also be configured to, for each play for the second player, receive a second wager.

Advantages to the multi-player implementations disclosed herein include increased machine turnover, a social gaming experience that encourages more people to wager on a game, an increase in the time players spend wagering on a device, and allows more players to play at peak times. Certain aspects require no changes to any existing hardware.

Additional aspects of the invention will be apparent to those of ordinary skill in the art in view of the detailed description of various embodiments, which is made with reference to the drawings, a brief description of which is provided below.

Figure 1A:
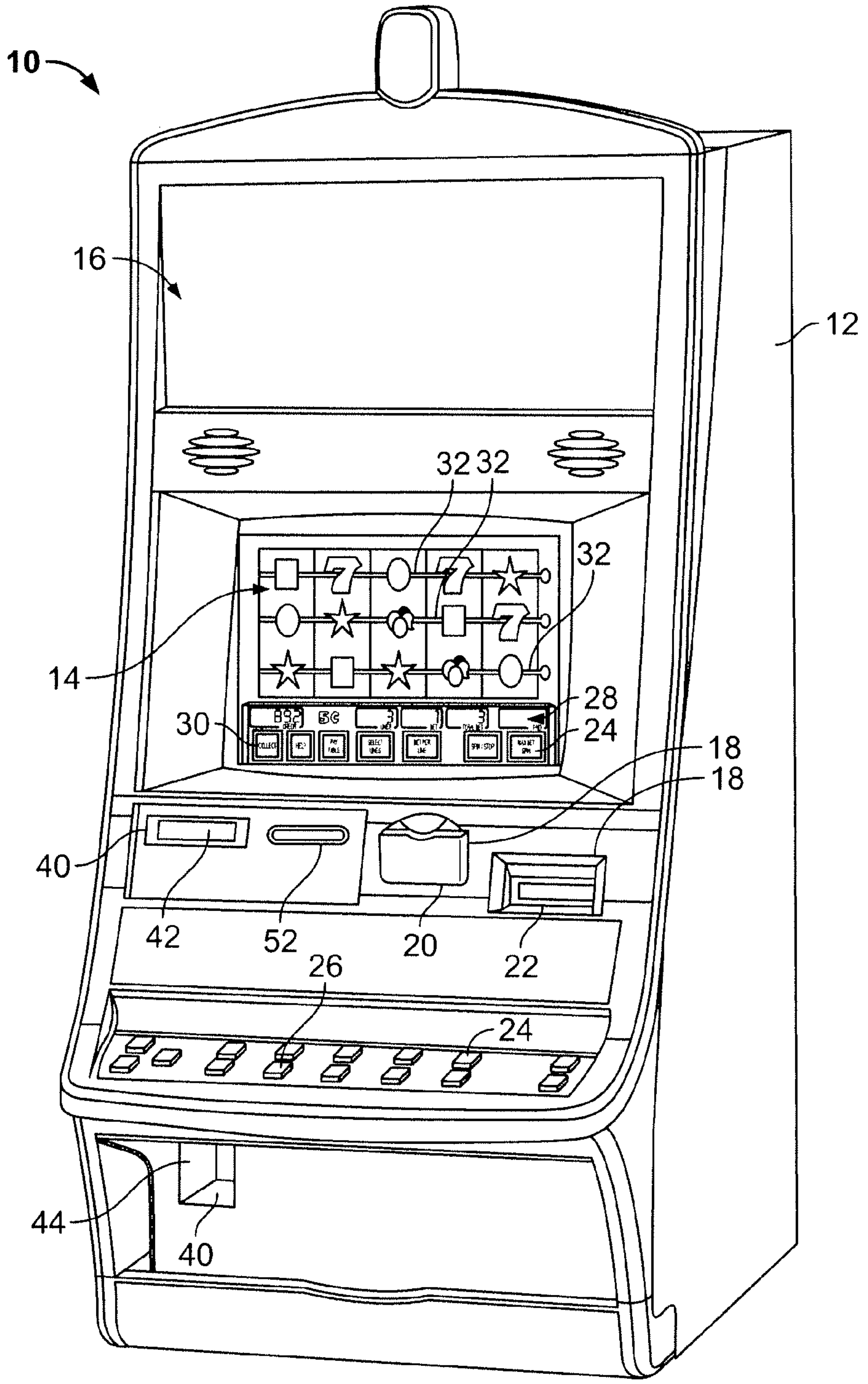
FIG. 1*a* is a perspective view of a free standing gaming machine embodying the present invention.

While aspects of the invention are susceptible to various modifications and alternative forms, specific aspects have been shown by way of example in the drawings and will be described in detail herein. It should be understood, however, that aspects of the invention are not intended to be limited to the particular forms disclosed. Rather, aspects of the invention are to cover all modifications, equivalents, and alternatives falling within the spirit and scope of the invention as defined by the appended claims.

DETAILED DESCRIPTION

While aspects of these inventions are susceptible of implementation in many different forms, there is shown in the drawings and will herein be described in detail preferred embodiments of the inventions with the understanding that the present disclosure is to be considered as an exemplification of the principles of the inventions and is not intended to limit the broad aspect of the inventions to the embodiments illustrated.

Certain patrons of gaming establishments may seek to maximize their collective winnings, patrons who may not wish to compete among themselves but still desire to achieve the highest possible winnings for their mutual benefit or may wish to place wagers or take other actions in a way that could benefit the other player. In this manner, even if the other player wins an award, both players feel that they have mutually benefited from the experience and have contributed toward the winning of the award. There is a need for gaming systems and methods that are directed to multi-player wagering games.

Referring to FIG. 1*a*, a gaming machine 10 is used in gaming establishments such as casinos. With regard to aspects of the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 a as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
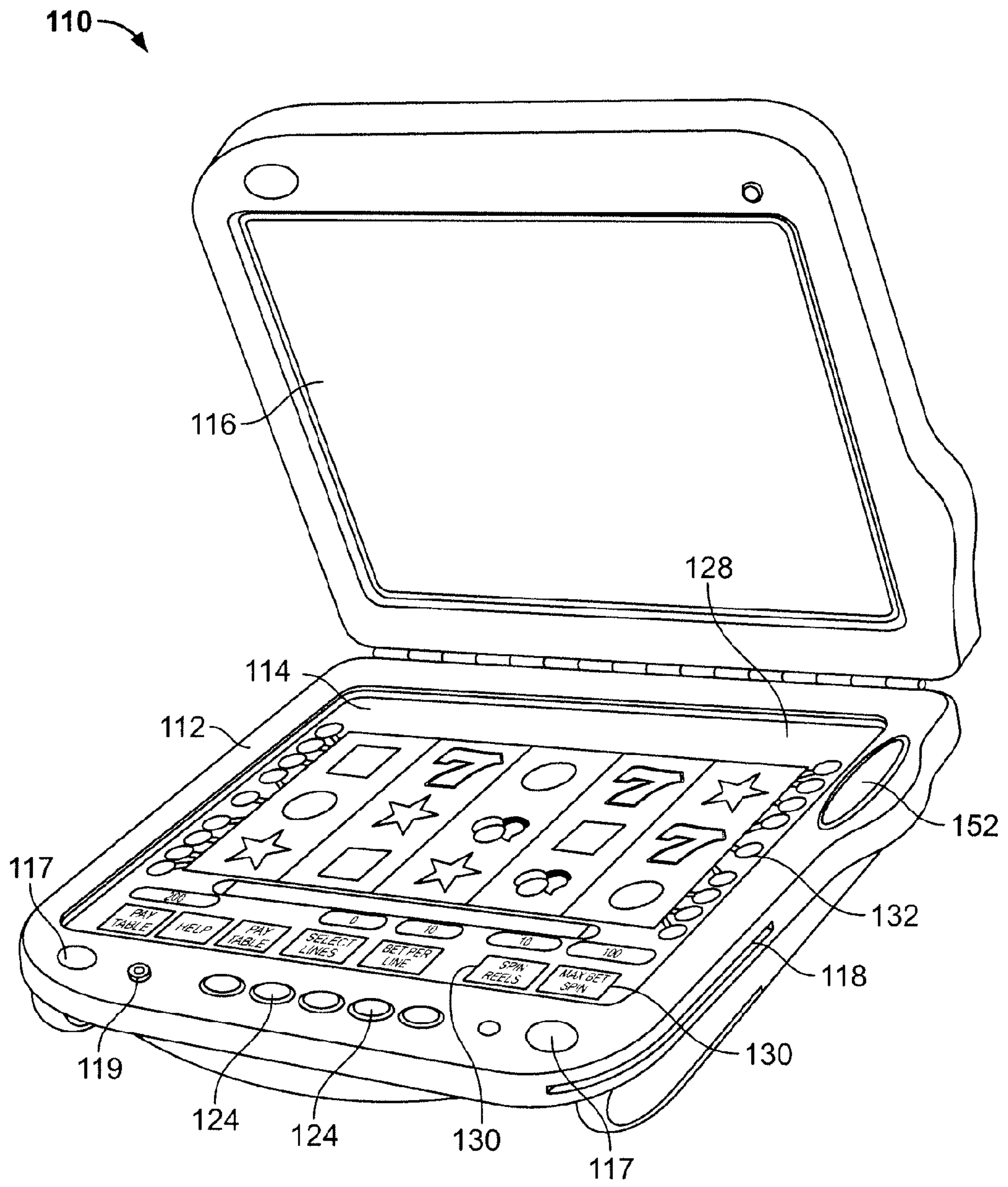
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
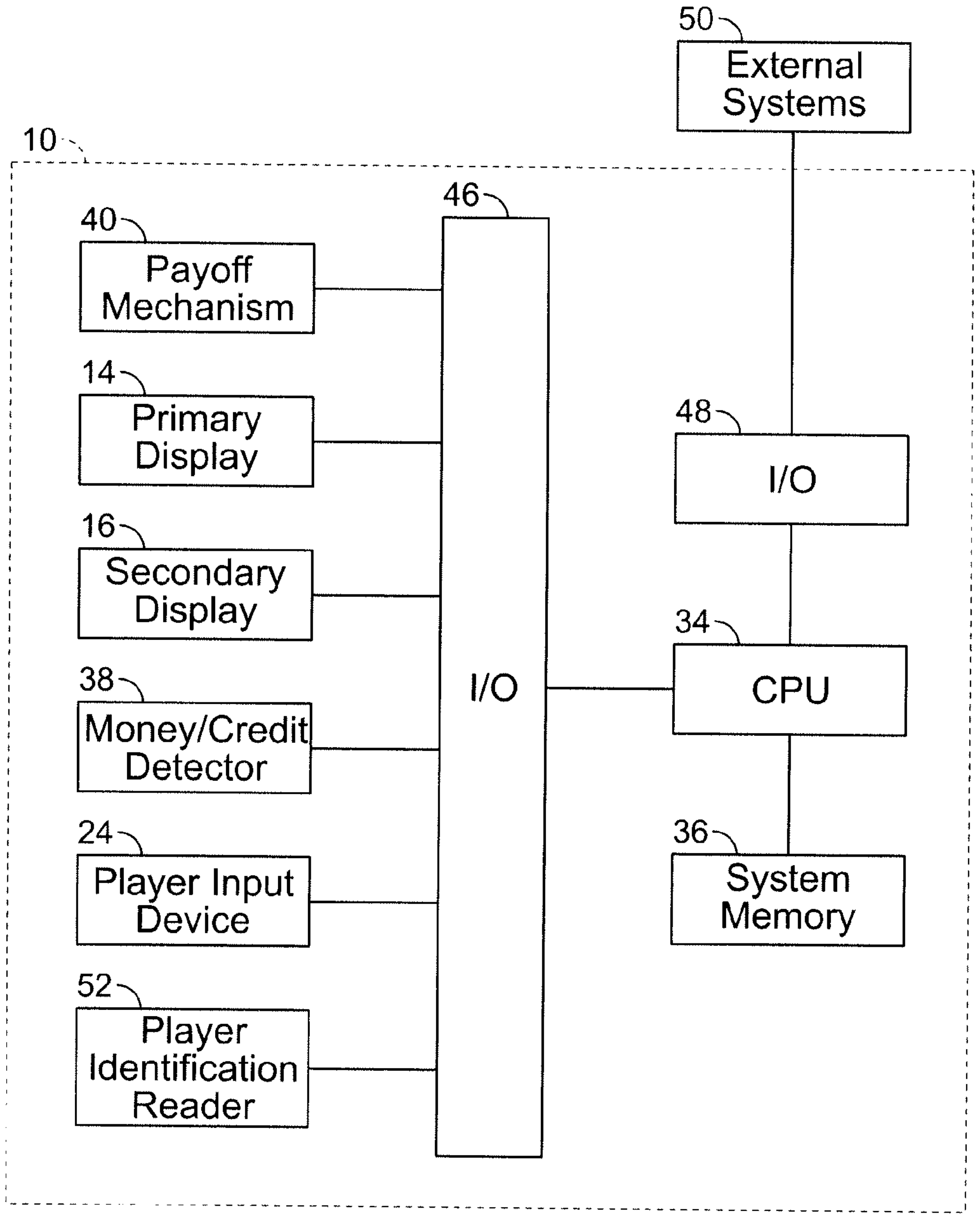
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 1 ObT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality there between (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display (s) of the machine. In an alternative "rich client" configuration, the server determines game outcomes, while the controller 34 on board the gaming machine executes game code and processes display information to be displayed on the display(s) of the machines In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Security features are advantageously utilized where the gaming machines 10, 110 communicate wirelessly with external systems 50, such as through wireless local area network (WLAN) technologies, wireless personal area networks (WPAN) technologies, wireless metropolitan area network (WMAN) technologies, wireless wide area network (W WAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to another network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, ESTABLISHING WIRELESS ROBUST SECURITY NETWORKS: A GUIDE TO IEEE 802.11, and SP 800-48, WIRELESS NETWORK SECURITY: 802.11, BLUETOOTH AND HANDHELD DEVICES, both of which are incorporated herein by reference in their entirety.

Aspects of the present invention are directed to multi-player wagering games and methods of playing them. These games may also be referred to as companion games. Some aspects exploit the fact that some players may wish to cooperate with one another to benefit the other player or for their mutual benefit. In this respect, their combined efforts result in at least the perception that those efforts led to an award that would otherwise not have been achievable had the players adopted a "winner take all," "feast or famine," or "to each his own" wagering strategy. Other aspects include wagering games that have competitive elements or features, but still allow multiple players to reap common benefits even if one player loses or to share benefits (such as awards, participation in a bonus game, or eligibility for enhanced awards or bonus rounds) with players who otherwise would be excluded from enjoying those benefits. Aspects of the present invention seek to encourage multi-player participation in a wagering game (though a single player could play multiple multi-player wagering games).

Figure 3:
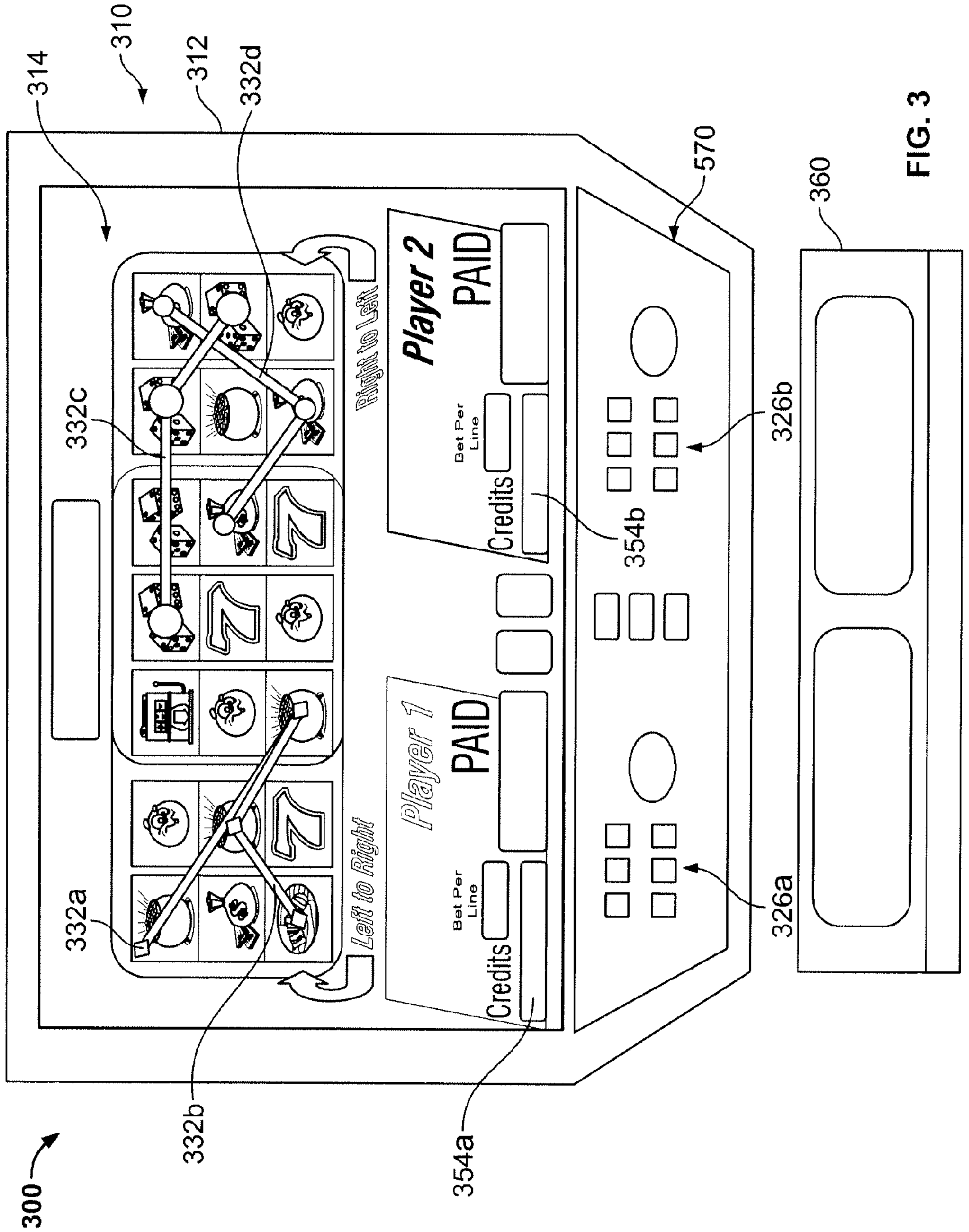
FIG. 3 is a multi-player slot wagering game displayed on a video display of a gaming machine.

Turning now to FIG. 3, a two-player slot wagering game 300 is shown displayed on a video display 314 of a gaming machine 310, which is operationally and structurally similar to gaming machines 10, 110 described above, except that the gaming machine 310 includes a button panel 570 (FIG. 5A) for receiving inputs from two players. The gaming machine 310 includes a cabinet 312, which preferably houses the video display 314, which is an LCD or plasma display and has a diagonal dimension of 26 inches. It should be understood, however, that any type or size of display may be utilized according to aspects of the present invention. The wider display area allows both players sitting on a double-wide chair 360 in front of the gaming machine 310 to view their respective areas of the wagering game 300. The button panel 570 is arranged below the video display 314, and may comprise physical buttons 326*a*, 326*b* or a touch screen overlaying a display or video display that displays virtual buttons 326*a*, 326*b* and other input devices, which are selectable via the touch screen. An exemplary arrangement of inputs devices on the button panel 570 is shown in more detail in FIG. 5.

The double-wide chair 360 has a width dimension that can accommodate two average-sized adults sitting next to one another. Both players of the wagering game 300 sit in the double-wide chair 360, and together the footprint of the gaming machine 310 and the double-wide chair 360 is preferably smaller than a footprint that two gaming machines and their respective chairs would occupy. In this manner, the "coin in" throughput of the gaming machine 310 can be significantly increased without requiring a significant increase in the floor space. For example, the gaming machine 310 may occupy only 25% more floor space as compared to a single gaming machine, such as the gaming machine 10, allowing twice the coin-in with less than twice the floor space. As a result, the coin-in rate per square foot can be increased. While the illustration shows the double-wide chair 360 arranged in front of a single gaming machine 310, in other implementations, the double-wide chair 360 can be arranged in front of multiple side-by-side gaming machines or around a bank of gaming machines arranged in circular configuration. The double-wide chair 360 may also be equipped with weight sensors to detect the presence of the number of players seated thereon. An armrest or other dividing structure may be positioned to prevent a single player from sitting in the center of the chair. Alternately, a sensor may be placed in the floor area in front of the chair to determine, for example, the number of feet placed on the floor for determining the number of players in front of the gaming machine 310.

The wagering game 300 includes two overlapping 3×5 array of reels on the video display 314. The three central reels are common to both players, and the players can choose to play the slots left-to-right, right-to-left, or both. In FIG. 3, Player 1 has selected to play the slots left-to-right, and Player 2 has selected to play the slots right-to-left. The players also each select a desired bet per line, which may differ from Player 1 to Player 2 (although individual bets on each array are equal). After these selections are made via the button panel 570 and are received by the gaming machine 310, the reels are spun and stopped and then all paylines are evaluated.

In an implementation, all paylines are automatically selected and evaluated in accordance with the direction selected by the player (left-to-right or right-to-left). Winning paylines 332*a*, 332*b*, 332*c*, 332*d* are displayed as shown in FIG. 3. Two credit meters 354*a*, 354*b* are shown, but in other aspects, one credit meter may be shared between Players 1 and 2. These aspects are described in more detail below.

When the players opt to play both directions, the wagering game 300 offers potential bonus wins of 6 and 7 symbol pays, increasing the total potential award versus a standard 3×5-symbol slot game. Bonus games can be triggered by one or both players, but both players play the bonus game. The players may also qualify for mystery bonuses.

The players may initiate the reel spin by pushing respective buttons on the button panel 570, or there may be provided a "duel button" which either player presses to initiate spinning of all of the reels in the 3×5 array. Alternately, a single push of the "duel button" may cause the reels to spin for player 1 followed by the reels spinning for player 2. Both players may be entitled to receive any portion or all of an award regardless of which player triggered the award.

Figure 4:
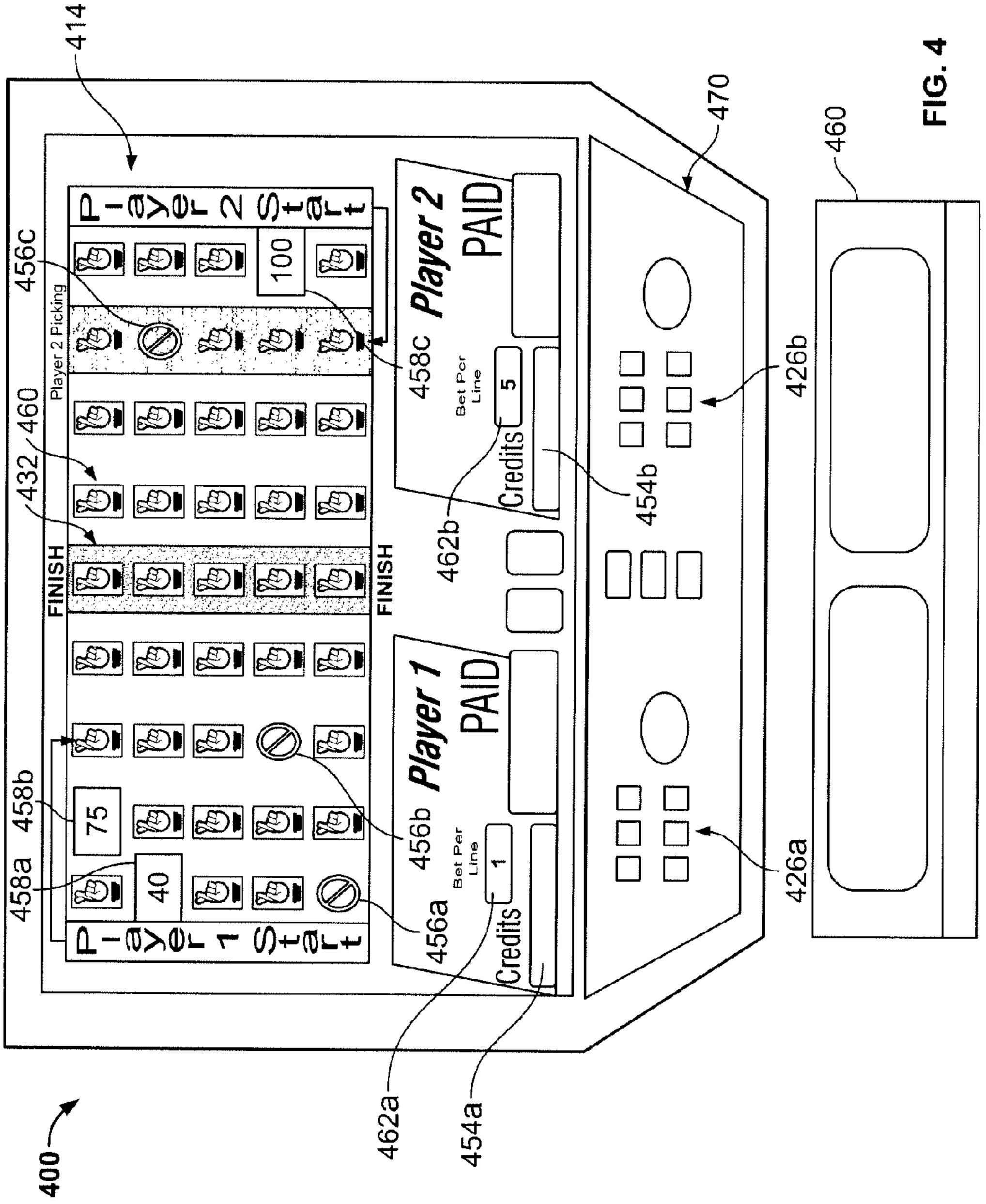
FIG. 4 illustrates a multi-player bonus-picking wagering game in which multiple players take turns picking items in columns on a video display from a grid starting on their respective start lines and ending in the middle.

FIG. 4 illustrates a multi-player bonus-picking wagering game 400 in which two players take turns picking items 458 in columns on a video display 414 from a grid starting on their respective start lines and ending in the middle 460. This turn-based picking wagering game has a competitive element, but avoids collusion and offers the possibility for both players to win a big jackpot if the players make five successful consecutive picks during a turn. The turns may simply alternate from player to player on a per-round basis or they may alternate based upon a player achieving or failing to achieve an award in a round of the wagering game wherein that player may play multiple consecutive rounds until losing a turn. If more than two players are playing, the players who have not yet failed to achieve an award may continue playing in subsequent bonus rounds until those players fail to achieve an award.

To play this bonus game, the starting player (e.g., Player 1) picks an item from a column in an area designated for Player 1. Here, Player 1 has selected item 458*a* via button panel 470 (or via a touch screen overlaying the display 414), which yields an award of 40 credits. A running tally of credits is displayed on respective credit meters 454*a*, 454*b*, though in other aspects, a single credit meter may be shared by both players. When it is Player 1's turn, Player 2's credit meter 454*b* may be grayed out or otherwise lightened or obscured until it is Player 2's turn. Here, Player 1 is awarded 40×1 credits (1 bet per line 462*a*) and Player 1's credit meter 454*a* is incremented accordingly. Also revealed in FIG. 4 is a stopper 456*a* (normally obscured but shown for ease of illustration and discussion), which if selected by the player, ends that player's turn, and the next player is allowed to take a turn picking items. Player 1 may be permitted to keep any awards accrued up until hitting the stopper 456*a*.

Upon selecting item 458*a*, Player 1 is permitted to continue picking because item 458*a* is an award. Player 1's credit meter may be incremented by an optional award amount associated with the item 458*a*. In the next column, Player 1 selects an item corresponding to an award of 75 credits, and continues to pick an item from the third column. Here, Player 1 selects a stopper 456*b* via buttons 426*a*, ending that player's turn. Now, Player 2 is allowed to select an item from Player 2's designated area. In the next column, Player 2 has selected a stopper 456*c* via buttons 426*b*, ending Player 2's turn. Whatever credits the players have accrued during this bonus game is shown on their respective credit meters 454*a*, 454*b*, but they are not eligible for the jackpot award because they did not make five successful picks during their turn. Each player may also wager a different amount on the bonus game, as shown on the display 414 in respective wager amount areas 462*a*, 462*b*.

Optionally, when Player 1 selects the stopper symbol 456*b*, the accrued credits (115 credits in this example) may be credited to Player 1, may not be credited to Player 1, or Player 1 may be presented with an option to transfer some or all of those credits to Player 2. It should be emphasized again that although two separate credit meters 454*a*, 454*b* are shown, in alternate implementations, a single credit meter is shared by Player 1 and Player 2, and awards are credited to the shared credit meter.

Thus, while both players "compete" against one another to make successful picks to reach the jackpot round, they are both working toward a common goal, which is to reach the jackpot round so that they can be eligible for a jackpot award 432 that may be shared by both players. Because the award may be shared (based on any predetermined allocation or allocation determined by one or both of the players), the players are not necessarily trying to further their own self interests but rather the common interest of both players. This encourages multi-player cooperation while still providing a competitive element to the wagering game.

The wagering game shown in FIG. 4 also prolongs the sense of anticipation in that even if Player 1 hits a stopper symbol 456*b*, that player may still anticipate a jackpot award if Player 2 navigates through the picks to land in the jackpot area 432 without hitting a stopper symbol. So, even though Player 1's turn in the bonus game has ended, the wagering game 400 still builds up a sense of anticipation in Player 1 during Player 2's turn, because if Player 2 lands a jackpot award 432, both players will share in that award. Thus, even though Player 1 has "lost" the bonus game, Player 1's sense of anticipation is renewed in that Player 1 may still win an award through Player 2's efforts. In this respect, Player 1 has to lose twice in order to leave empty handed.

In some aspects, the jackpot area 432 represents a common accomplishment in the wagering game in that reaching the common accomplishment has the potential to result in a monetary award for the first player, the second player, or both. When both players achieve the common accomplishment (e.g., reach the jackpot area 432), the wagering game may generate a monetary or non-monetary award and may enhance an award associated with the randomly selected game outcome of the wagering game. Thus, while achieving the common accomplishment will result in some kind of an award, it will not necessarily be a monetary award, but at least has the potential to be a monetary award. As used herein, a common accomplishment may include a game outcome, a level, a number of credits, an award type, a type of card hand, or the like. For example, a common accomplishment in FIG. 3 may be both players achieving the same set of symbols along the same payline or achieving the same number of credits during a wagering game. The monetary or non-monetary award may include any combination of a credit, a bonus token, a free game, a free play, a free spin, a multiplier, access to a bonus game, or access to a progressive game.

When both players reach the jackpot area 432 and thus achieve a common accomplishment, the wagering game 400 generates a monetary or non-monetary award, and this award may represent an enhancement of the award associated with a randomly selected game outcome of the wagering game. In other words, in some aspects, achieving the common accomplishment may result in a new award, monetary or non-monetary, or it may represent an enhancement of the award associated with the randomly selected game outcome of the wagering game 400.

Figure 5A:
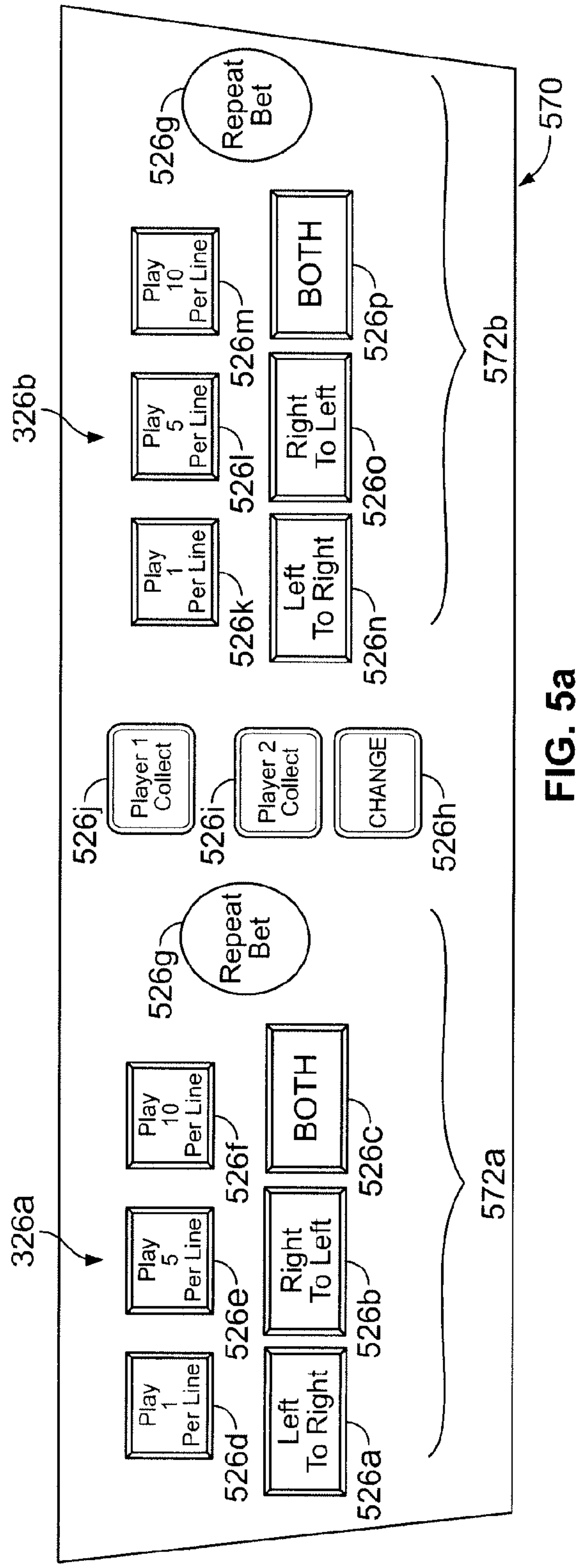
FIG. 5*a* illustrates an exemplary multi-player button panel for receiving selections from multiple players.

FIG. 5*a* illustrates an exemplary two-player button panel 570, also shown in FIG. 3, for receiving selections from two players. Each player has separate areas 572*a*, 572*b* for making selections. The button panel 570 includes a number of buttons as shown, which may be physical buttons or "virtual" buttons displayed on a video display and actuated via a touch screen overlaying the video display. The video display may include a transmissive LCD display so that the text or graphics displayed on the transmissive display can be altered via software.

Player 1's selection area 572*a* includes payline evaluation order buttons 526*a*, 526*b*, 526*c*, which instruct the wagering game 300 where to start evaluating the symbols and in which direction. Player 1's selection area 572*a* also includes bet per line buttons 526*d*, 526*e*, and 526*f* and a convenient Repeat Bet button 526*g*. Similarly, Player 2's selection area 572*b* includes payline evaluation order buttons 526*n*, 526*o*, 526*p*, which instruct the wagering game 300 where to start evaluating the symbols and in which direction. Note that a single player can make inputs on the button panel 570 by selecting the appropriate buttons for both Player 1 and Player 2. Player 2's selection area 572*b* also includes bet per line buttons 526*k*, 5261, and 526*m* and a convenient Repeat Bet button 526*q*. In the center of the button panel 570, there are a Player 1 collect button 526*j*, a Player 2 collect button 526*i*, and a Change button 526*h*.

Figure 5B:
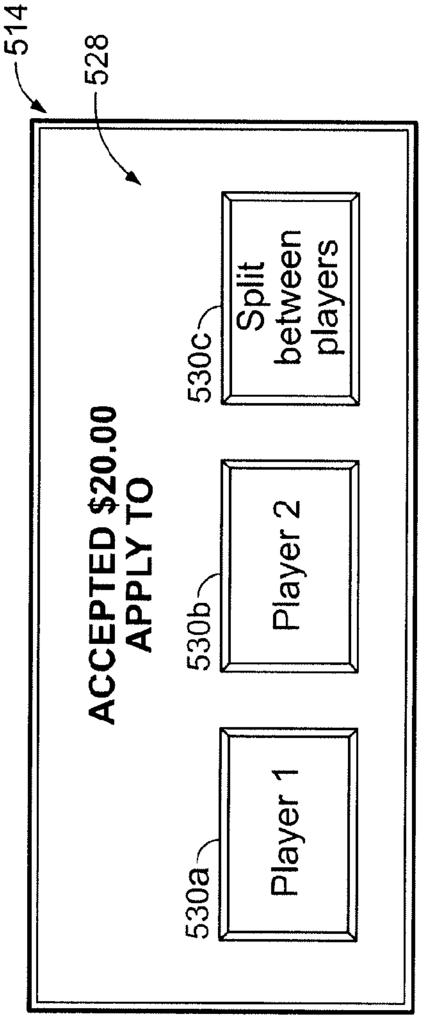
FIG. 5*b* illustrates an exemplary graphic in which multiple players have inputted a wager amount from a funding source and are prompted to indicate where the wager amount should be applied.

In the exemplary graphic shown in FIG. 5*b*, the players have inputted into the gaming machine a wager amount from a funding source and are prompted to indicate where the wager amount should be applied. A Player 1 button 530*a*, Player 2 button 530*b*, and a button 530*c* for splitting the wager amount between players are presented on a video display 514 that underlies a touch screen 528. If a player selects button 530*c*, the wagering game next prompts the player for how the funds should be allocated between the two players. Based on that allocation, the gaming machine credits the player's respective credit meters. During the wagering game, a similar graphic can be displayed to the players to allow them to allocate award amounts to Player 1 or to Player 2 or to split the award amounts between the players according to a desired or predetermined ratio. Cashout requests can be handled in a similar manner, i.e., by splitting the cashout amount according to a desired or predetermined ratio (including 100% to a first player and 0% to a second player).

In an implementation, Player 1 may allocate "companion credits" to be shared with Player 2, who may be playing a wagering game at another gaming machine remote from the one being played by Player 1 or playing at a two-player wagering game such as any of the ones disclosed herein. If Player 2 wins an award, Player 1 shares in the award in an amount commensurate with the amount of companion credits wagered by Player 2 on the wagering game that yielded the award. The companion credits allow players to share their credits with complete strangers, because the credit-donors stand to share in the winnings of the credit-recipients and therefore have an incentive to allow other players to use their credits. This implementation may be applied to any of the wagering games disclosed herein or to any other compatible wagering game.

In a similar implementation, Player 1 may place a "side wager" on a wagering game being played by Player 2. The side wager may be wagering on the fact that Player 2 will hit a bonus, and if that occurs, Player 1 may be awarded a chance to play Player 2's bonus game. Any award from the bonus game may be awarded exclusively to Player 1 or split between Player 1 and 2. Alternately, Players 1 and 2 may play separate primary games individually but may both activate a companion bonus feature or mode in which both players play the bonus game and share any bonus award or in which one player plays the bonus game and both players share any bonus award. In these implementations, the players cooperate to share in any awards that may be awarded to either player. Wagering games according to certain aspects disclosed herein appeal to the cooperative and sharing spirit of players, particularly players who know one another, and provides an incentive for players to play together in order to maximize their collective benefit. This implementation may be applied to any of the wagering games disclosed herein.

In another implementation, a turn-based, two-player wagering game (primary or bonus) is disclosed in which players take turns, much like in a volleyball game, playing a wagering game and accruing winnings to a shared or individual credit meter. For example, Player 1 may play the wagering game until Player 1 loses, whereupon control is passed to Player 2 who plays until Player 2 loses. Any accrued winnings are credited to the player's respective credit meters or to a shared credit meter that may be split among the players. An arrow or other indicator may be displayed to indicate the player whose turn it is to play. This implementation may be applied to any of the wagering games disclosed herein.

Figure 6:
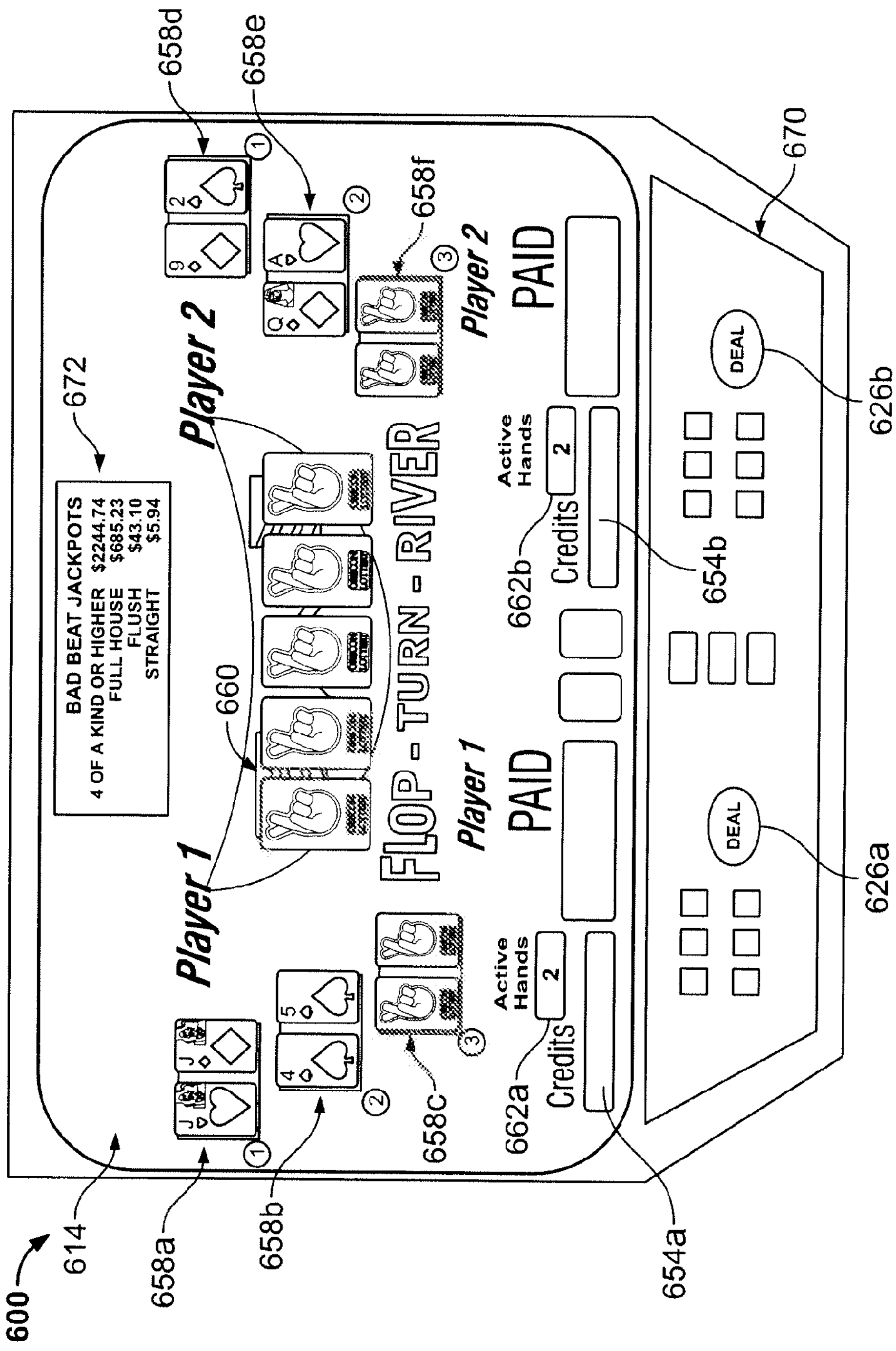
FIG. 6 illustrates an exemplary head-to-head Hold 'Em poker wagering game with a "bad beat" progressive award that can be awarded to a player with a losing poker hand.

FIG. 6 illustrates an exemplary head-to-head, multi-player, Hold 'Em poker wagering game 600 with a "bad beat" progressive award that can be awarded to a player with a losing poker hand. A poker table is displayed on a video display 614. Player 1 is dealt three sets of hole cards 658*a* (hand 1), 658*b* (hand 2), 658*c* (hand 3), and Player 2 is dealt three sets of hole cards 658*d* (hand 1), 658*e* (hand 2), 658*f* (hand 3). Each player can wager on 1, 2, or 3 hands. In the center of the poker table, there is a set of five community cards 660, against which the hands 1, 2, and 3 are evaluated. Alternately, each player's hands can be evaluated alternately or additionally against a dealer's hand (not shown). In this implementation, the players can play head-to-head against the dealer as well as playing head-to-head against one another.

The community cards 660 are revealed with the flop, followed by the turn, and finally the river. Following each revelation, the odds can be displayed to the players, adding anticipation to each outcome. Each hand is evaluated against the community cards 660 or the dealer's hand according to a paytable, but, in addition, hands 1, 2, and 3 (as many are in play) head-to-head against the opponents' hands and/or optionally the dealer's hand. The highest hand wins the game, except that if the losing player has a hand that corresponds to one of the hands listed on a progressive jackpot display 672, the losing player wins the jackpot amount listed on the progressive jackpot display 672 corresponding to the hand held by the losing player. In this game, players are encouraged to play head-to-head in order to qualify for the progressive awards. A player must actually lose a hand to win a progressive award, which adds an additional incentive for the player to compete head-to-head with another player. While the head-to-head poker game may have a "winner-takes-all" outcome, it is also possible to achieve a "loser-takes-all" outcome. This paradigm is quite different from traditional wagering games in which players must achieve a winning outcome to receive an award. Here, the "bad beat" progressive award rewards players with a losing hand, maintaining a player's interest and sense of anticipation in the wagering game.

In the example shown, Player 1 and Player 2 have wagered on two hands, hands 1 and 2, and once they are evaluated against the community cards 660 after they are revealed, the wagering game checks whether the hands of the losing player corresponds to any of the hands listed in the jackpot display area 672. For example, if Player 2 has the highest hand after the community cards 660 are evaluated, Player 1's hands 658*a*, 658*b* together with the community cards 660 are evaluated to determine whether any of them correspond to any of the hands listed in the jackpot display 672. The exemplary hands listed in the jackpot display 672 are 4 of a kind or higher, a full house, a flush, or a straight. These are exemplary only, and of course fewer, more, or different combinations of hands may be listed in the jackpot display 672. This jackpot is termed a "bad beat" jackpot because it is only winnable if a player loses in a head-to-head wagering game against another player.

The exemplary hands listed in the progressive jackpot display 672 represent at least one criterion that is associated with the progressive award that must be satisfied in order for the player whose hands meet the at least one criterion to receive the progressive award. For example, if Player 2 has a full house, which is inferior to Player 1's hand, that player will receive a progressive award in the amount of $685.23 as shown in the example of FIG. 6. In some aspects, this amount may include the award that Player 1 would have been awarded but for Player 2's satisfying one of the criterion associated with the progressive jackpot display 672. If neither Player 1 or Player 2 wins any of the progressive awards shown in the progressive jackpot display 672, the progressive award amounts may be increased until a player satisfies any of the criterion for winning any of the progressive awards shown in the progressive jackpot display 672.

Figure 7:
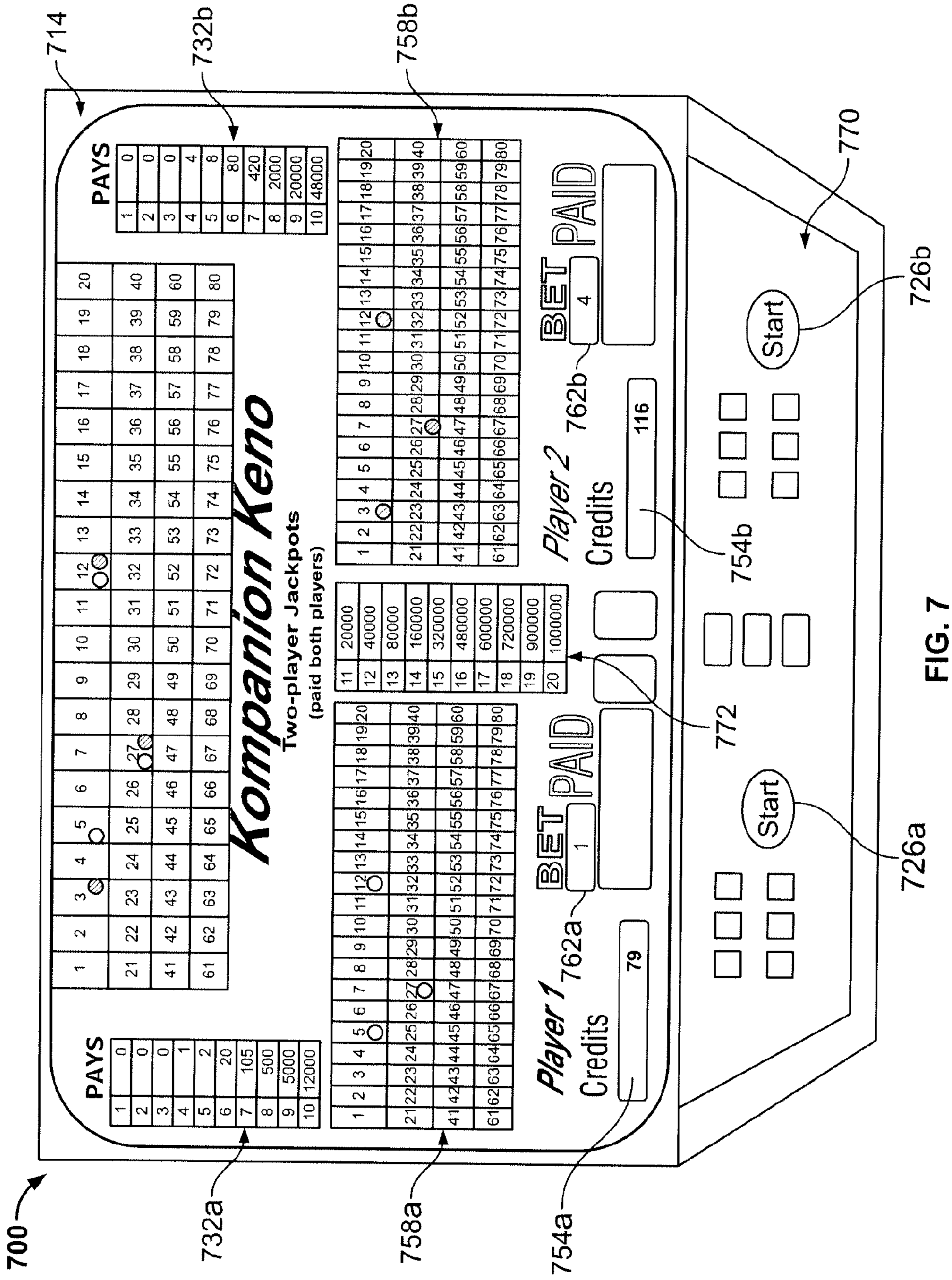
FIG. 7 illustrates an exemplary multi-player keno wagering game.

FIG. 7 illustrates an exemplary two-player keno wagering game 700 according to aspects of the present invention. The wagering game 700 features two keno ticket cards 758*a*, 758*b* bearing 40 or 80 numbers each (the illustrated embodiment features 80 possible numbers). Each player may select up to 10 numbers each, and the paytables 732*a*, 732*b* for each player are conventionally based upon the number of picks and the number of catches and the amount wagered 762*a*, 762*b* by the respective players. In the two-player keno wagering game 700 shown, the players can also qualify for a two-player jackpot based on the results of both players' cards 758*a*, 758*b*. Wager amounts and awards are reflected on the players' respective credit meters 754*a*, 754*b*. The jackpot award amounts are listed in a jackpot award area 772 on a display 714 depicting the two-player keno wagering game 700. Player inputs are received via a two-player button panel 770.

By allowing the players' total award to be enhanced via an evaluation of both players' number picks, the wagering game 700 provides an incentive for two-player cooperation. Both players pick numbers on their respective ticket cards 758*a*, 758*b* either independently or jointly, and their cards are combined to assess whether a jackpot award should be awarded. In the event of a jackpot award, the wagering game 700 may prompt the players to select how they want to the credits to be added to their credit meters 754*a*, 754*b*. They can be shared or the entire amount of the jackpot award can be credited to one player's credit meter 754*a* or 754*b*.

Figure 8A:
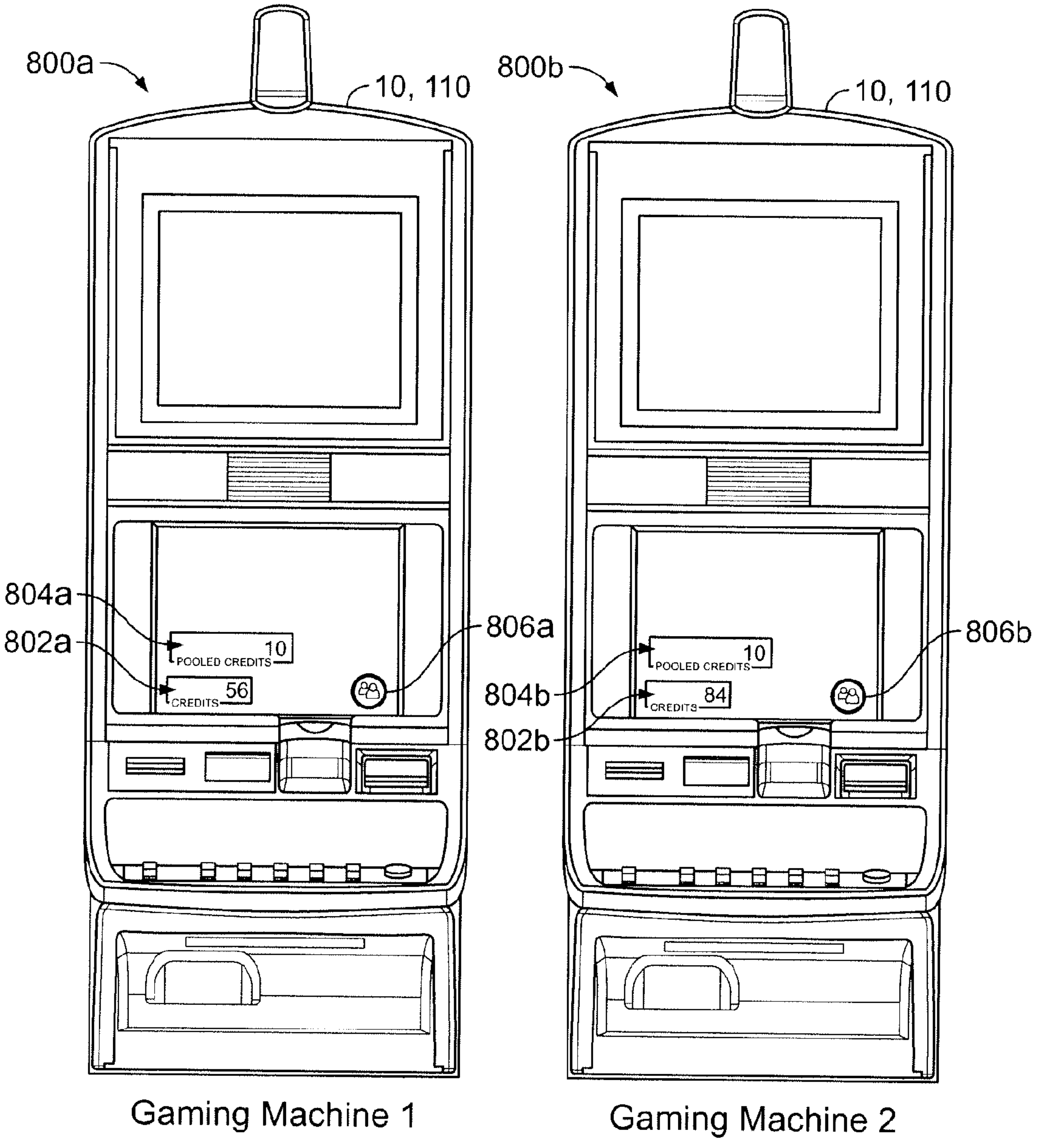
FIG. 8*a* illustrates an exemplary two-player implementation involving two gaming devices.

FIG. 8*a* illustrates a configuration in which two players, Player 1 and Player 2, can play a competitive or cooperative two-player wagering game on two separate but linked gaming machines 800*a*, 800*b*, which may be arranged side-by-side as shown. Alternately, the gaming machines 800*a*, 800*b* may not be next to one another but are communicatively linked to one another via wired or wireless connections. Each of the gaming machines 800*a*, 800*b* may be structurally and operationally based upon the gaming machines 10, 110 shown in FIGS. 1*a* and 1*b*. Each gaming machine 800*a*, 800*b* also includes a credit meter 802*a*, 802*b*, respectively, which displays the amount of credits remaining to the player that are available to wager. The gaming machines 800*a*, 800*b* may display the same wagering game or different wagering games, including any of the wagering games disclosed herein in connection with FIGS. 3-7 above. Each gaming machine 800*a*, 800*b* may optionally include a pooled credit meter 804*a*, 804*b*, respectively, and the purpose of this credit meter is explained more fully below. Finally, each gaming machine 800*a*, 800*b* includes a "dual play" button 806*a*, 806*b*, respectively, to configure the gaming machines 800*a*, 800*b* in a two-player mode.

Figure 8B:
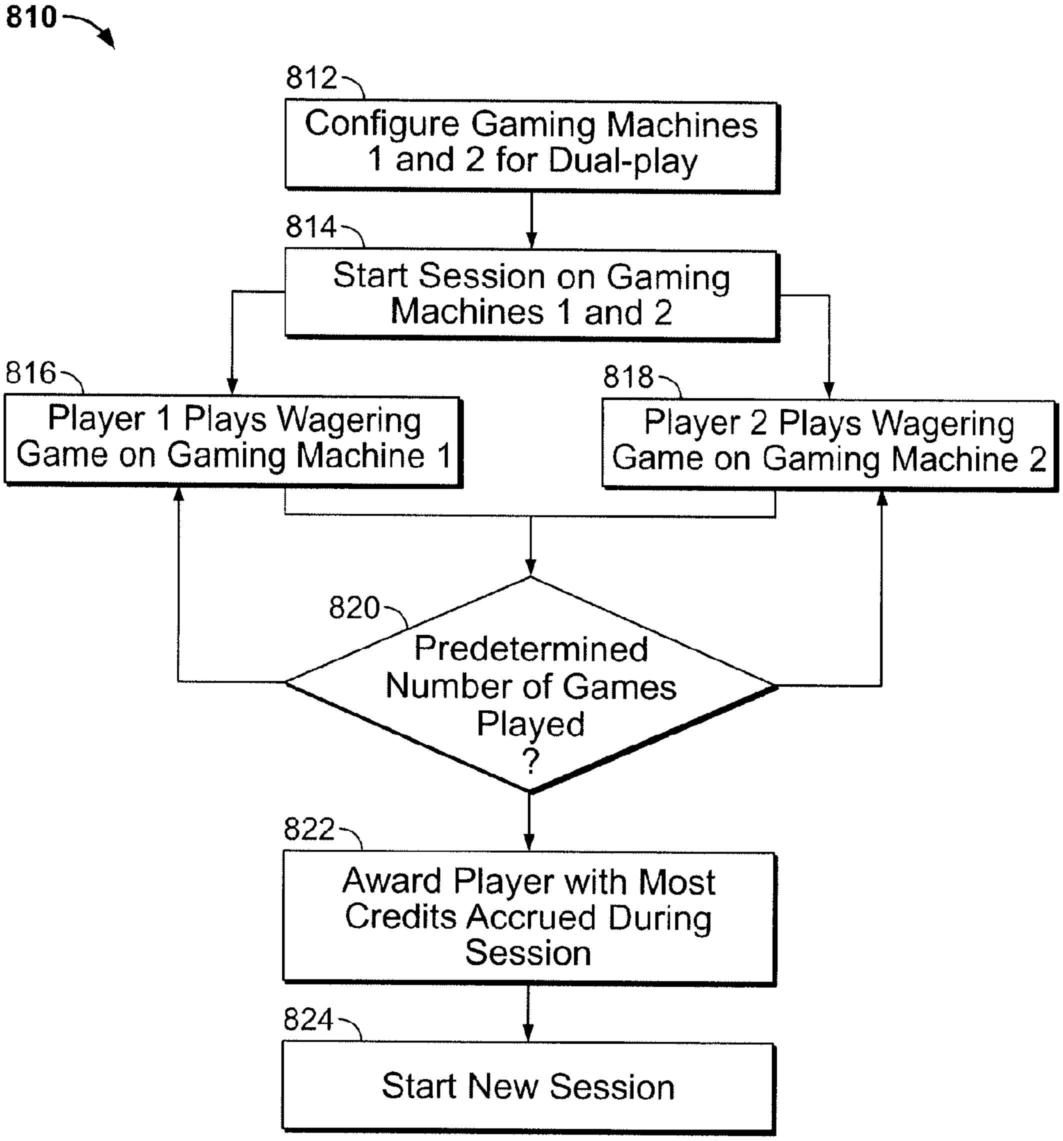
FIG. 8*b* is an exemplary flow chart diagram of a two-player implementation according to various aspects of the present invention.

FIG. 8*b* is a flow chart diagram of an exemplary method for a two-player implementation in which Player 1 and Player 2 compete against one another or cooperate with one another to win the other player's credits or a pooled amount of credits or any other predetermined number of credits. The flow chart may be implemented as an algorithm 810 that configures the first gaming machine 800*a* and the second gaming machine 800*b* for dual-play. To do so, the game software for each game reserves memory space for tracking at least the credit balances associated with each gaming machine 800*a*, 800*b* and the number of wagering games played on the gaming machines 800*a*, 800*b* during a game session. The gaming machines 800*a*, 800*b* have the ability to report the number of wagering games played and the credit balances to each other or to a remote server, which may be part of the external systems 50 shown in FIG. 2. The gaming machines 800*a*, 800*b* also receive data indicative of an input by a player to configure the gaming machine 800*a*, 800*b* for dual-play, such as when the player push or touch the "dual play" buttons 806*a*, 806*b*.

To initiate a dual-play session, both players provide an input indicative of a desire to initiate a dual-play session such as by pushing or touching the buttons 806*a*, 806*b*. A virtual (such as via the touch screen 28) or a physical button (such as one of the push buttons 26) that includes a label such as "Dual Play" or the like may be presented to the player who presses the button to indicate a desire for dual-play. In the example shown, a graphic showing two players is displayed on a virtual button. The gaming machines 800*a*, 800*b* configure themselves for dual-play, and a communication link is established between both machines for this purpose (812). Both gaming machines 800*a*, 800*b* confirm that each other has received an input from the respective players to initiate a dual-play session. They also confirm that the players have inputted a wager amount. For example, each player may input $20 as a wager amount, resulting in 2000 credits apiece for a penny denomination machine. A person of ordinary skill in the art would recognize that other wager amounts and credit values could be used, for example the $20 wager could result in 400 credits for a nickel denomination machine. Optionally, the starting balance of the credit meter 802*a* is communicated to the gaming machine 800*b*, and the starting balance of the credit meter 802*b* is communicated to the gaming machine 800*a*. The players may also input respective supplemental wagers that accumulate in a pooled credit meter 804*a*, 804*b*. Both players' supplemental wagers are added together and the resulting amount is displayed in the pooled credit meter 804*a*, 804*b*.

Once configured for dual-play, a new gaming session is initiated on the gaming machines 800*a*, 800*b* (814). Respective counters in the system memory 36 of the gaming machines 800*a*, 800*b* track the number of wagering games played by Player 1 and Player 2, respectively.

Player 1 and Player 2 play their respective wagering games on their respective gaming machines 800*a*, 800*b* (816, 818).

These wagering games may be played simultaneously or not. In other words, the gaming machines 800*a*, 800*b* may be configured to wait for the other gaming machine to complete the wagering game before permitting a subsequent wagering game to be played. Alternately, the wagering games may be played by the respective players at their own pace, subject only to a predetermined limit on the number of games playable during the gaming session. This free-play implementation is better suited for competitive play, in which the players try to play as many wagering games during the gaming session as possible to increase the chances that their respective credit meter will have a higher balance at the conclusion of the gaming session than the other player's credit meter. The gaming machines 800*a*, 800*b* check whether a predetermined number of total wagering games on one or both machines have been played (820). To do, the counters associated with both gaming machines are updated every time a wagering game is played on either gaming machine 800*a*, 800*b*. As mentioned before, the wagering games played on the gaming machines 800*a*, 800*b* may the same or different wagering games.

Instead of determining whether a predetermined number of wagering games have been played on one or both of the machines, the algorithm 810 may determine whether another predetermined criterion has been met, such as, for example, when a player achieves a progressive award, a bonus game, a multiplier, or any other monetary or non-monetary award. During competitive play, players are thus encouraged to play as many wagering games as fast as they can to be the first player to satisfy the predetermined criterion.

If the predetermined number of wagering games has not been played yet or the predetermined criterion not yet met, the players continue playing the wagering games either simultaneously or independent of one another until a limit is met. Once the predetermined number of games has been played or the predetermined criterion has been met, the gaming session is ended and the player with the highest number of credits at the end of the gaming session is awarded at least some or all of the other player's credits (822). In other words, if Player 1 accrued fewer credits during the gaming session than Player 2, at least some or all of Player 1's credits (56 in the example shown) are added to Player 2's credit meter (presently at 84 in the example) such that Player 2 is awarded a total of 142 or some amount greater than 84 credits and the credit meter 802*b* is updated accordingly. A new gaming session may be started (824) or the dual-play terminated such that the gaming machines return to a single-player configuration.

In the event of a tie, the algorithm 810 may determine which player was the last player to achieve an award just prior to the conclusion of the gaming session and either add that player's credits to the other player's credit meter or add the other player's credits to that player's credit meter. Or, the balances on the credit meters 802*a*, 802*b* may simply be left as they are, and the players may initiate a new gaming session (824).

Following any wagering game played during a gaming session or following the conclusion of a gaming session, the player who was awarded more credits following the wagering game or the end of a gaming session is awarded the number of pooled credits shown in the pooled credit meter 804*a,b*. In this implementation, the players increase their potential award with little or no house advantage with respect to the pooled credits (the house still maintains its advantage with respect to the wagering game). At various points during a gaming session, any player may increase the number of pooled credits by inputting a supplemental wager.

The dual-player implementation described above in connection with FIGS. 8*a* and 8*b* can encourage either cooperative or competitive play among players. For players who cooperate with one another, this implementation can encourage a companion, who otherwise may not participate as actively or prefers to be a passive onlooker, to play with another player. Coin-in per hour will be increased, and the overall entertainment value is enhanced when more players are actively wagering on gaming machines. For players who play competitively against one another, this implementation encourages both players to wager more than they might otherwise wager and to play at a faster rate because of the perception that by playing more wagering games there is a higher probability of having a higher credit balance at the conclusion of the gaming session than the other player. The stakes are higher, as well, because the losing player stands to walk away with nothing. On the other hand, although Player 2 inputted 80 credits and only gained 4 credits during the gaming session, normally that player would have only won a total of 4 credits. With the dual-player implementation, that player's award is increased to 60 credits, which represents a substantially higher award than Player 2 otherwise would have been awarded had Player 2 played as in single-player mode. A person of ordinary skill in the art would recognize that if a penny denomination machine is played, if Player 2 inputted 2000 credits, and only gained 100 credits during the gaming session, normally that player would have only won a total of 100 credits. With the dual-player implementation, that player's award is increased to 1500 credits.

The wagering games described above and shown in FIGS. 3-8*b* can also be configured for play in a single-person mode. In this mode, some of the two-player features may be disabled or modified when only a single player is present. In this way, gaming machines do not sit idle when two players are not present to play the wagering game. As mentioned above, weight sensors in the double-wide chair positioned in front of the two-player gaming machine or foot counters in the floor in front of the chair may provide signals to the gaming machine indicative of the number of players seated in front of it. The gaming machine may then automatically configure itself to play one- or two-player wagering games, or the option may be presented to the player(s) to select a one- or two-player wagering game. As mentioned above, a single player may play a two-player game by simply placing wagers and making inputs that the would-be second player would do. For example, any of the button panels 470, 570, 670, 770 may include a single button that may be pushed to play both games simultaneously. This single button can be pushed by a single player to play two wagering games simultaneously.

In another head-to-head aspect in which the players face off as in a duel, a traditional gaming machine can easily be retrofitted for multi-player play by providing a separate credit meter for each player and modifying the game software for multiple players. As mentioned above in connection with FIG. 3, the button that initiates reel spin on the gaming machine may be a head-to-head button, which initiates reel spins for both player either simultaneously or in seriatim. Only one button push is needed to spin the reels for all of the players playing the wagering game. Alternately, as discussed above, the wagering game may alternate between two players such that only one player plays at a time, such as in a volleyball game. When the active player is playing, the credit meter of the non-active players can be grayed out to indicate which player may take a turn on the wagering game. The wagering game automatically switches control of the wagering game from player to player. Players may alternate turns or turns may be determined based upon an active player failing to achieve an award, at which time control is passed to the next player who plays until that player fails to achieve an award, and so forth. In another implementation in which the wagering game is slots, a push of the head-to-head button causes a series of consecutive spins to be carried out in series, with the wagering game automatically switching between players as the series of spins are carried out. The switching may be alternating or based upon a volleyball-like fashion whereby an active player continues to spin until that player fails to achieve an award.

In this head-to-head play aspect, both players may be entitled to feature awards regardless of which player triggered the award. A special symbol may be displayed to award a non-active player, whose credit meter may be incremented by an amount associated with the special symbol. In this respect, the non-active player remains interested in the active player's game play.

The graphical user interface (GUI) of a multi-player wagering game may present virtual buttons on the video display 14, which may be overlaid by a touch screen 28, wherein each virtual button permits the player(s) to select the number of players to play a wagering game on any of the gaming machines disclosed herein.

Figure 9A:
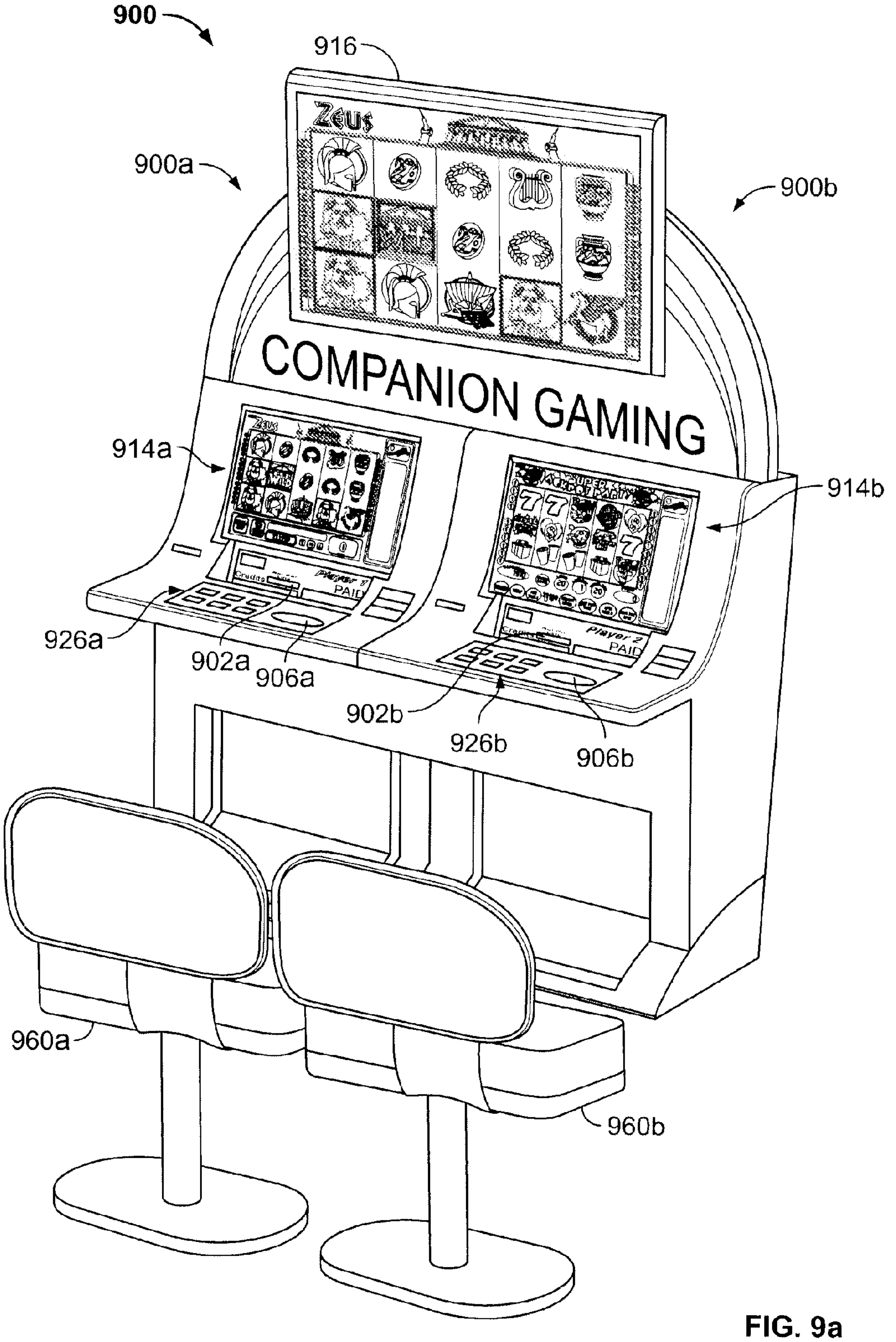
FIG. 9*a* is illustrates an exemplary two-player implementation involving two gaming modules.

FIG. 9*a* illustrates a configuration in which two players, Player 1 and Player 2, can play a competitive or cooperative two-player wagering game on a gaming machine 900 that includes two separate but linked gaming modules 900*a*, 900*b*, which may be arranged side-by-side as shown. Each of the gaming modules 900*a*, 900*b* may be structurally and operationally based upon gaming machines 10, 110 shown in FIGS. 1*a* and 1*b*. Each of the gaming modules 900*a*, 900*b* includes a primary display 914*a*, 914*b*. Each gaming module 900*a*, 900*b* also includes a credit meter 902*a*, 902*b*, respectively, which displays the amount of credits remaining to the player that are available to wager. The gaming modules 900*a*, 900*b* may display the same wagering game or different wagering games. Each gaming module 900*a*, 900*b* includes an input device 926*a*, 926*b*. Each gaming module 900*a*, 900*b* also includes an initiate spin button 906*a*, 906*b*. Two individual chairs 960*a,b* are placed immediately adjacent to and in close proximity to one another (i.e., less than a few inches apart) and are positioned in front of the gaming machine 900. Alternatively, a double-wide chair, such as the double-wide chair 360 shown in FIG. 3 having a sufficient size to accommodate two persons sitting side-by-side thereon can be positioned in front of the gaming machine 900.

Thus, gaming machine 900 provides separate displays and input devices for each player, allowing each player to actively participate in gaming at the same time, rather than requiring players to take turns. This is advantageous compared to games that require one player to surrender control to a second player before that second player can participate. For example, allowing a player to play continuously without waiting for another player to finish keeps the player engaged and adds to the sense of excitement. This also increases the coin in, as both players can continuously play rather than pausing to allow the other player to finish. Moreover, providing displays and input devices in close proximity to one another, along with the double-wide chair 960 or the side-by-side chairs 960*a,b* encourages gaming in either a cooperative or competitive fashion. For example, providing a single gaming machine with inputs, displays, and seating for two encourages companions to game together, and encourages the companion who would otherwise be a spectator to actively participate in the game.

The gaming machine 900 also includes a secondary display 916, for example positioned above the primary displays 914*a*, 914*b*, and centered relative to the double-wide chair 960. The secondary display 916 can be used, for example, to display bonus games. The gaming machine 900 is configured to receive input from both gaming modules 900*a*, 900*b* for a common bonus game and display the common bonus game on the secondary display 916. Providing bonus games on a display common to both players further encourages cooperative play by focusing the two players' attention on a single display and enhances the excitement of team play.

Figure 10:
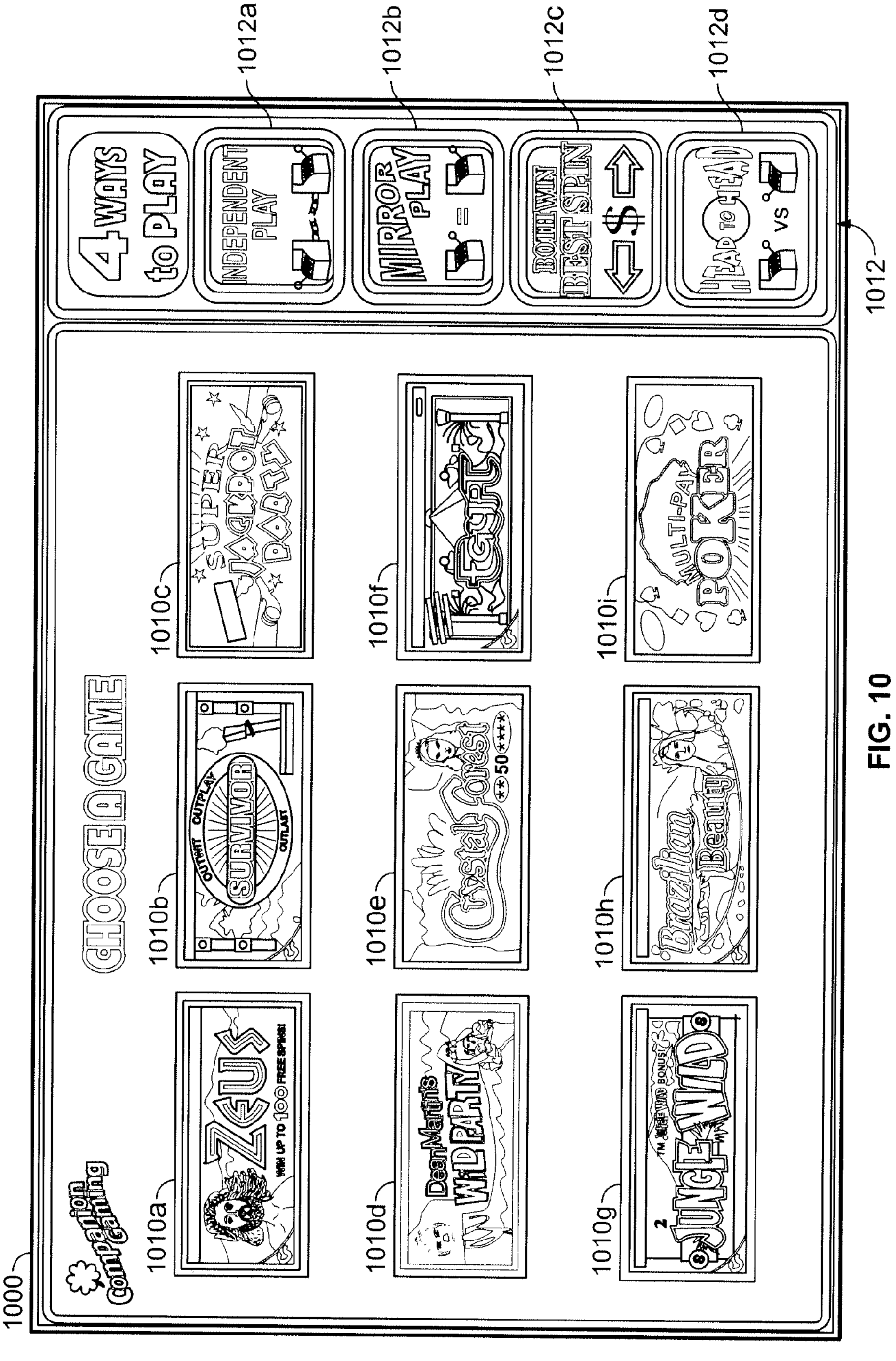
FIG. 10 illustrates an exemplary multi-player game menu.

Gaming modules 900*a*, 900*b* can be played in an independent play mode, in which each gaming module operates independently of the other. In independent play mode, two players can play different games while sitting next to one another. In this mode, neither the games nor their outcomes are linked. Gaming modules 900*a*, 900*b* can also be played in a dual-play session, in which two players play cooperatively or competitively. FIG. 10 is an example of a game menu 1000 that can be displayed to each player on the primary displays 914*a*, 914*b*. The game menu 1000 includes a menu including a plurality of wagering games 1010*a*, 1010*b*, 1010*c*, 1010*d*, 1010*e*, 1010*f*, 1010*g*, 1010*h*, 1010*i* that players can select and a menu including a plurality of play modes 1012 that players can select. The wagering games can be slot games including arrays of symbols representing reels. The menu of play modes 1012 of FIG. 10 includes selections for independent play 1012*a*, along with three examples of "dual-play" modes, "mirror-play" 1012*b*, "best-spin" 1012*c*, and "head to head" 1012*d*. Selections 1012*a* through 1012*d* can be touch screen buttons. Alternately, selections 1012*a* through 1012*d* could be icons selected by actuating either dedicated buttons or other scrolling and selecting buttons of input devices 926*a*, 926*b*.

Figure 9B:
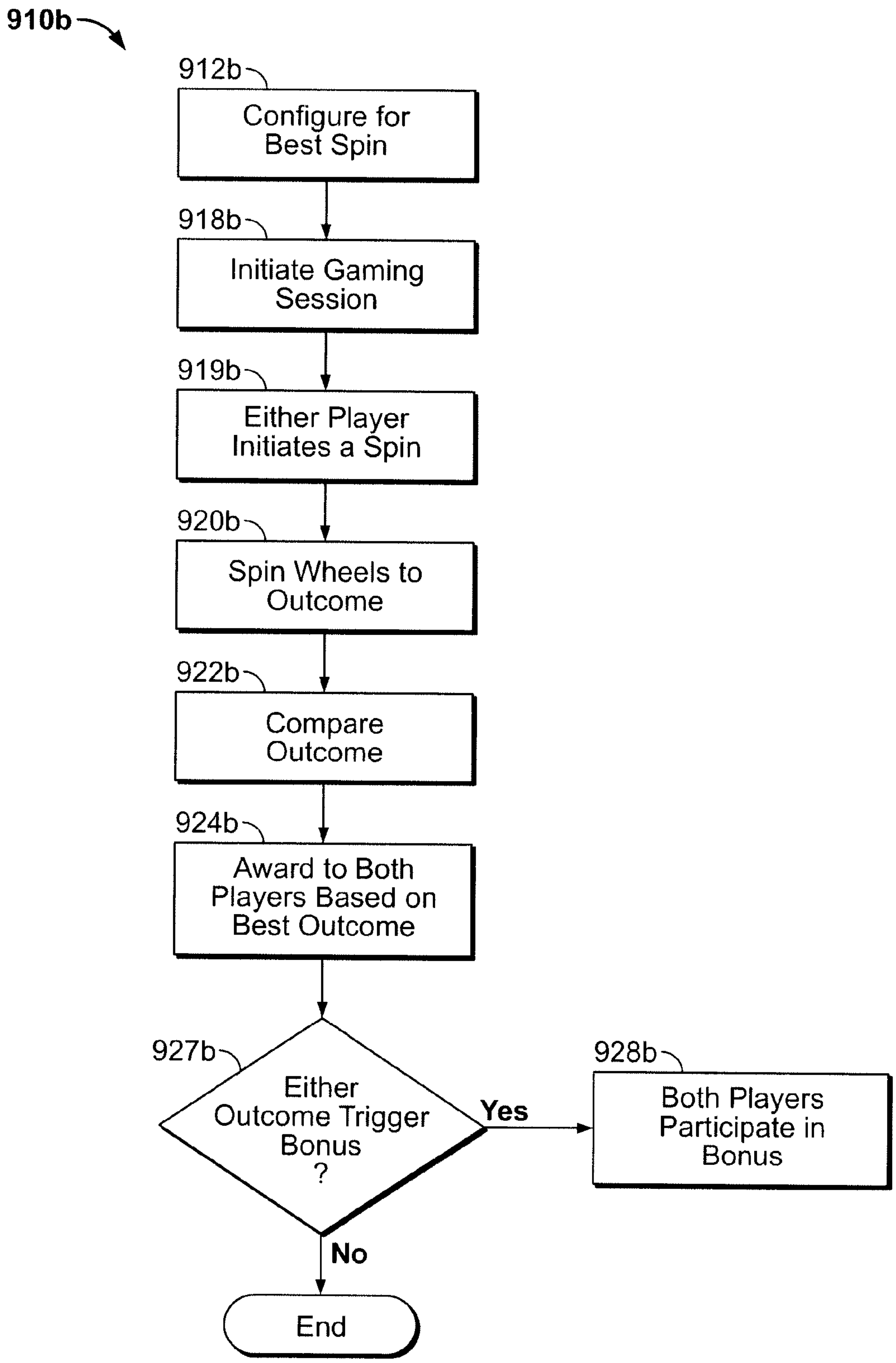
FIG. 9*b* is an exemplary flow chart diagram of a two-player implementation according to various aspects of the present invention.

FIG. 9*b* is a flow chart diagram of an exemplary method for a two-player implementation in which Player 1 and Player 2 cooperate with one another to win a number of credits. The flow chart may be implemented as an algorithm 910*b* that configures the first gaming module 900*a* and the second gaming module 900*b* for a best-outcome mode of play (e.g., a "best-spin" mode of play). The gaming modules 900*a*, 900*b* have the ability to report the credit balances to each other or to a remote server, which may be part of the external systems 50 shown in FIG. 2. The gaming modules 900*a*, 900*b* also receive data indicative of an input by a player to configure the gaming modules 900*a*, 900*b* for best spin play, such as when either or both of the two players actuates or touches a "best spin" button of input devices 926*a*, 926*b* or icon 1012*c*.

To initiate a best-spin session, both players provide an input indicative of a desire to initiate a best-spin session such as by actuating or touching the "best spin" buttons of input devices 926*a*, 926*b*, or otherwise selecting the "best spin" icon 1012*c*. For example, the first player can initiate a best-spin session by actuating or touching the "best spin" button of input device 926*a*, and the second player is given the option of joining the best-spin session, e.g., by being prompted acknowledge a desire to join.

Figure 11:
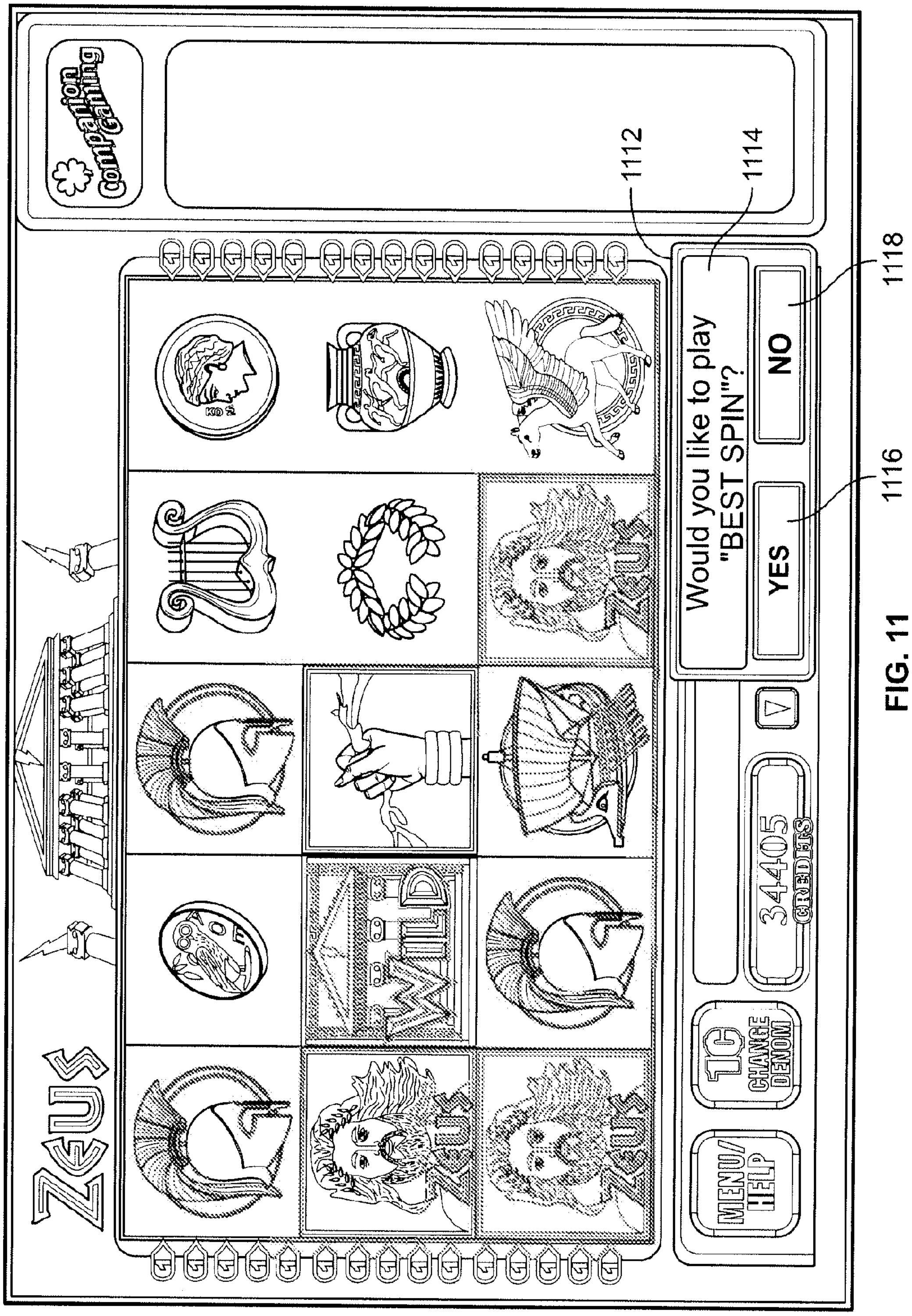
FIG. 11 illustrates an exemplary prompt to join a two-player game.

FIG. 11 shows an example of a display 1100 displayed to the second player including a display of the game symbols 1110 and a pop-up dialog box 1112 prompting the second player to join a best spin session with the question "would you like to play "Best Spin?" 1114, and including "yes" and "no" icons 1116, 1118. The second player may accept the invitation by selecting the "yes" icon 1116, for example by pressing the corresponding icon on a touch screen or actuating a button (e.g., a "yes" button, a "best spin" button, or other indication of selection) on the input device 926*b*.

FIG. 12 shows an example of the content displayed on displays 914*a*, 914*b* during a "best spin" session. Each player is presented with the same game symbols 1210. Each player is also presented with his or her own winnings, credits, etc. 1212*a*, 1212*b*.

Referring to FIG. 9*b*, the gaming modules 900*a*, 900*b* configure themselves for best-spin play, and a communication link is established between both machines for this purpose (912*b*). Both gaming modules 900*a*, 900*b* confirm that each other has received an input from the respective players to initiate a best-spin session. They also confirm that the players have inputted a wager amount. For example, each player may input $20 as a wager amount, resulting in 2000 credits apiece for a penny denomination machine. Optionally, the starting balance of the credit meter 902*a* is communicated to the gaming module 900*b*, and the starting balance of the credit meter 902*b* is communicated to the gaming module 900*a*. The Players can also be given the option of cancelling a best-spin play or any other dual-play session, for example through a cancel button on input 926*a*, 926*b* or touch screen 28. Cancelling the best-spin play session results, for example, in the gaming modules 900*a*, 900*b* returning to displaying menu 1000 of FIG. 10.

Once configured for best-spin play, a new gaming session is initiated or invoked on the gaming modules 900*a*, 900*b* (918*b*). The wagering games, for example, include arrays of symbols representing reels on video displays 914*a*, 914*b*. Either Player 1 or Player 2 initiates a round (e.g., a spin of the arrays of reels), for example by actuating the initiate spin button 906*a*, 906*b* (919*b*). The reels of both gaming modules 900*a*, 900*b* are simultaneously spun to their own randomly selected outcomes (920*b*). The randomly selected outcome of the gaming module 900*a* is compared to the outcome of the gaming module 900*b* to determine the best outcome of the two (922*b*). Both players may be entitled to receive an award based on the best outcome of the two (924*b*).

The best-spin mode of play allows both players to play as a team and cooperate towards an award. This increases excitement, as a player can not only enjoy the outcome of his or her own spin, but can also share in the excitement of his or her companion, as the companion's outcome may entitle both players to an award. Moreover, because both players are seated next to one another, and the primary displays 914*a*, 914*b* are in close proximity to one another, the excitement of team play is further enhanced. While each player has his or her own display and input device, and each is an active participant, both are able to view the display of the other, adding to the sense of teamwork.

Figure 12B:
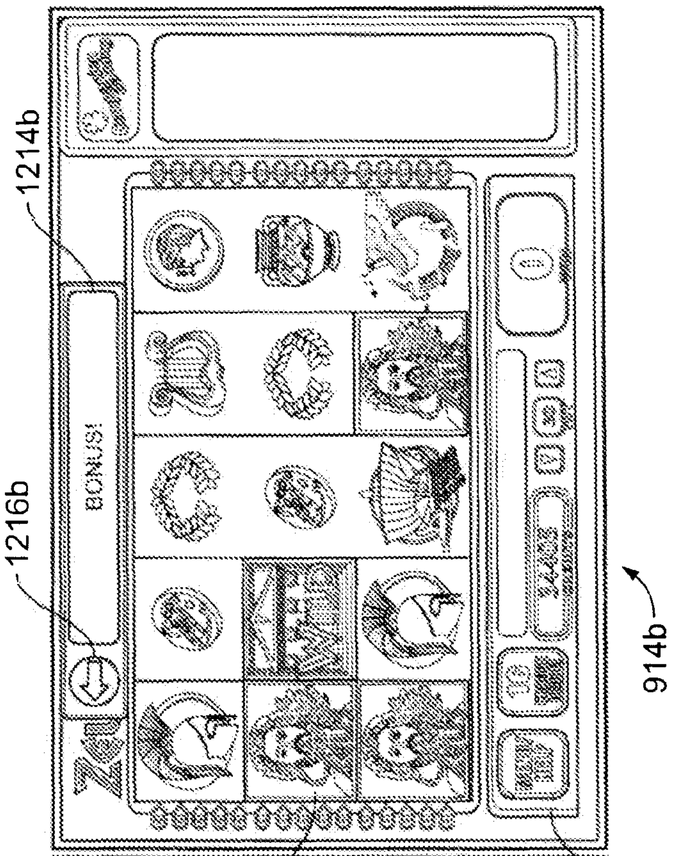
FIGS. 12*a* and 12*b* illustrate exemplary bonus indications.
Figure 12A:
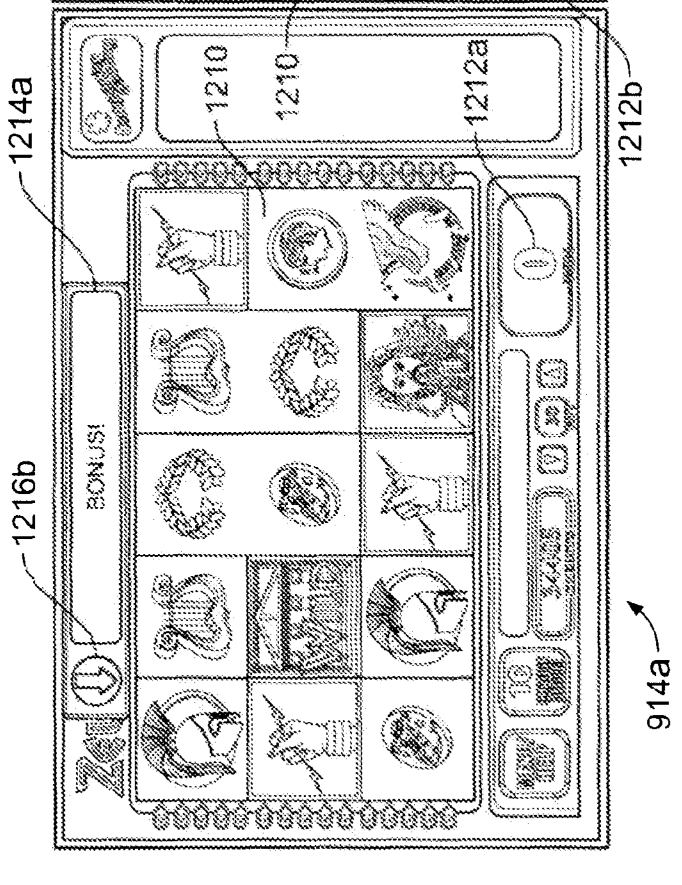

The software can also determine whether Player 1's outcome or Player 2's outcome triggers a bonus game (927*b*). If either gaming module 900*a*, 900*b* triggers a bonus game, both players may receive any bonus award awarded by the bonus game (928*b*). As shown in FIG. 12*a* and FIG. 12*b*, a message portion 1214*a*, 1214*b* of the displays 914*a*, 914*b* can be configured to indicate the bonus to the two players. Additionally, the displays 914*a*, 914*b* may display an icon 1216*a*, 1216*b* indicating which player triggered the bonus, for example an arrow pointing down 1216*a* to indicate to a player that his or her module 900*a* triggered the bonus, or an arrow pointing to the side 1216*b* indicating that the other module 900*a* triggered the bonus. The bonus game can be the multi-player bonus picking wagering game 400 of FIG. 4. Player 1 and Player 2 each use their own input device 926*a*, 926*b* to make their picks, and view the common bonus game on the secondary display 916. The common bonus game further encourages cooperation and enhances the excitement of team play. Alternatively, each player can play the bonus game individually, and both players can receive an award based on the best outcome of the individually played bonus games. In another embodiment, the bonus game can be a reel-type game, and each player plays individually. Both players can be awarded an award based on the best bonus outcome of the two. The bonus game can be displayed on the primary displays 914*a*, 914*b*, together on the secondary display 916, or on separate bonus displays.

Figure 9C:
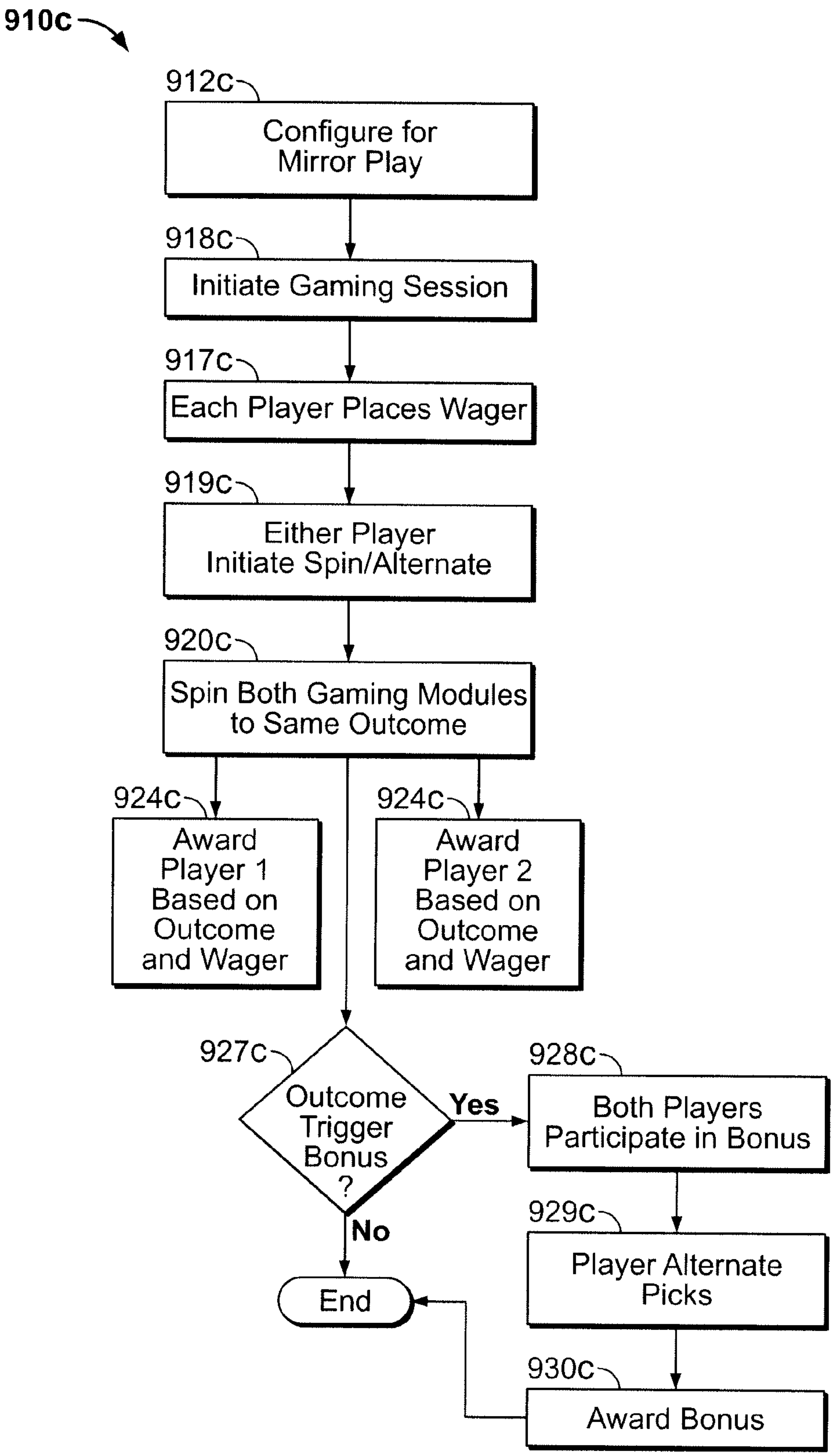
FIG. 9*c* is an exemplary flow chart diagram of a two-player implementation according to various aspects of the present invention.
Figure 9D:
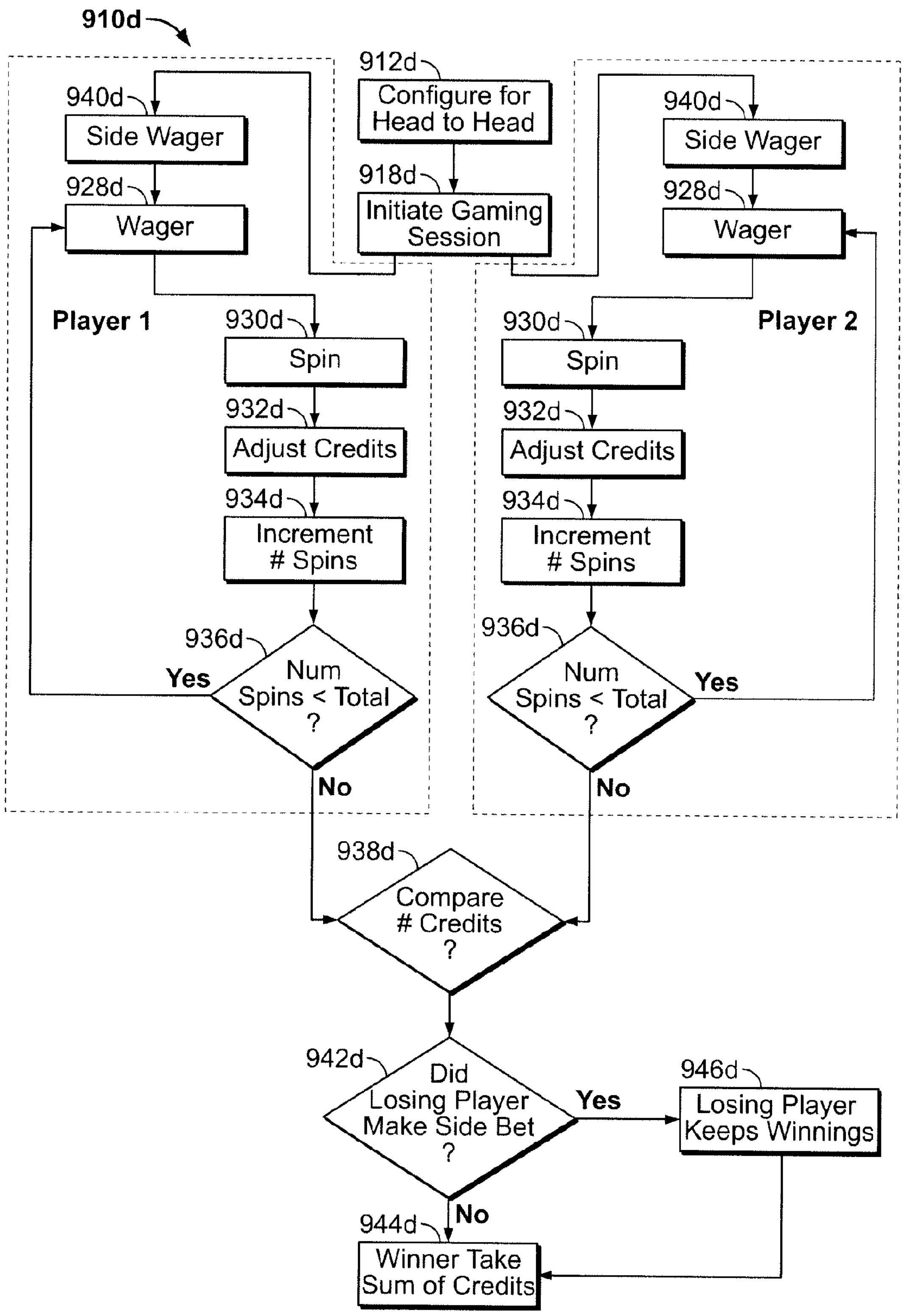
FIG. 9*d* is an exemplary flow chart diagram of a two-player implementation according to various aspects of the present invention.

FIG. 9*c* is a flow chart diagram of an exemplary method for a two-player implementation in which Player 1 and Player 2 cooperate with one another to win a number of credits. The flow chart may be implemented as an algorithm 910*c* that configures the first gaming module 900*a* and the second gaming module 900*b* for a "Minor Play" mode. The gaming modules 900*a*, 900*b* have the ability to report the credit balances to each other or to a remote server, which may be part of the external systems 50 shown in FIG. 2. The gaming modules 900*a*, 900*b* also receive data indicative of an input by a player to configure the gaming modules 900*a*, 900*b* for mirror play mode, such as when a player actuates or touches a "mirror play" button on input 926*a*, 926*b*.

To initiate a minor-play session, both players provide an input indicative of a desire to initiate a mirror-play session such as by pushing or touching the buttons 926*a*, 926*b*. For example, the first player can initiate or invoke a minor-play session by actuating or touching the mirror play button on input 926*a*, and the second player is given the option of joining the mirror-play session, e.g., by being prompted to push or touch the minor play button on 926*b*. A virtual (such as via the touch screen 28) or a physical button (such as one of the push buttons 26) that includes a label such as "Minor Play" or the like may be presented to the player who presses the button to indicate a desire for mirror play. The gaming modules 900*a*, 900*b* configure themselves for a mirror-play mode, and a communication link is established between both machines for this purpose (912*c*). Both gaming modules 900*a*, 900*b* confirm that each other has received an input from the respective players to initiate a minor-play session. They also confirm that the players have inputted a wager amount. Player 1 and Player 2 can input different wager amounts. Optionally, the starting balance of the credit meter 902*a* is communicated to the gaming module 900*b*, and the starting balance of the credit meter 902*b* is communicated to the gaming module 900*a*. The Players can also be given the option of cancelling a mirror-play session, for example through a cancel button on input 926*a*, 926*b* or touch screen 28. Cancelling the mirror-play session results, for example, in the gaming modules 900*a*, 900*b* returning to displaying menu 1000 of FIG. 10.

Once configured for a minor-play mode, a new gaming session is initiated or invoked on the gaming modules 900*a*, 900*b* (918*c*). The wagering games, for example, include arrays of reels on video displays 914*a*, 914*b*. Each player inputs a separate wager (917*c*). Either Player 1 or Player 2 initiates a round (e.g., a spin of the arrays of reels), for example by actuating the initiate spin button 906*a*, 906*b* (919*c*). For example, the software can be configured such that Player 1 and Player 2 alternate initiating spins. Both gaming modules 900*a*, 900*b* spin to the same outcome (920*c*). Both players may be entitled to receive an award based on the outcome and commensurate with their individual wagers (924*c*). For example, if Player 1 wagers 750 credits and Player 2 wagers 2250 credits, Player 1's award will be commensurate with the 750 credit wager and Player 2's award will be commensurate with the 2250 credit wager. Thus, each player can wager a separate amount, while both players can experience the same outcome as a team.

In minor play, each player is still an active participant, and can make his or her separate wager. Yet both players are sharing in a common game, with a common outcome.

The software can determine whether the outcome triggers a bonus game (927_c_). If the outcome triggers a bonus, both players may participate in the bonus (928_c_). For example, the bonus can be the multi-player bonus picking wagering game 400 of FIG. 4. The software can be configured to allow Player 1 and Player 2 to take turns picking in the bonus game (929_c_). Player 1 and Player 2 each use their own input device 926_a_, 926_b_ to make their picks, and view the common bonus game on the secondary display 916. The common bonus game further encourages cooperation and enhances the excitement of team play.

FIG. 9_d_ is a flow chart diagram of an exemplary method for a two-player implementation in which Player 1 and Player 2 compete with one another to win a number of credits. The flow chart may be implemented as an algorithm 910_d_ that configures the first gaming module 900_a_ and the second gaming module 900_b_ for a "head-to-head" mode of play, where the players compete against each other to obtain the most credits. The gaming modules 900_a_, 900_b_ have the ability to report the credit balances to each other or to a remote server, which may be part of the external systems 50 shown in FIG. 2. The game software also reserves memory space for tracking at least the credit balances associated with each gaming module 900_a_, 900_b_ and the number of wagering games played on the gaming modules 900_a_, 900_b_ during a game session. The gaming modules 900_a_, 900_b_ also receive data indicative of an input by a player to configure the gaming modules 900_a_, 900_b_ for head-to-head play, such as when a player pushes or touches a "head-to-head play" button on input device 926_a_, 926_b_.

To initiate a head-to-head play session, both players provide an input indicative of a desire to initiate or invoke a head-to-head play session such as by pushing or touching the "head-to-head play" button on input device 926_a_, 926_b_. For example, the first player can initiate or invoking a head-to-head play session by actuating or touching "head-to-head play" button on input device 926_a_, and the second player is given the option of joining the head-to-head play session, e.g., by being prompted to push or touch "head-to-head play" button on input device 926_b_. A virtual (such as via the touch screen 28) or a physical button (such as one of the push buttons 26) that includes a label such as "Head-to-Head Play" or the like may be presented to the player who presses the button to indicate a desire for head-to-head play. The gaming modules 900_a_, 900_b_ configure themselves for the head-to-head mode of play, and a communication link is established between both machines for this purpose (912_d_). Both gaming modules 900_a_, 900_b_ confirm that each other has received an input from the respective players to initiate a head-to-head play session. They also confirm that the players have inputted a wager amount. Player 1 and Player 2 can input different wager amounts. Optionally, the starting balance of the credit meter 902_a_ is communicated to the gaming module 900_b_, and the starting balance of the credit meter 902_b_ is communicated to the gaming module 900_a_. The Players can also be given the option of cancelling a head-to-head play session, for example through a cancel button on input 926_a_, 926_b_ or touch screen 28. Cancelling the head-to-head play session results, for example, in the gaming modules 900_a_, 900_b_ returning to displaying menu 1000 of FIG. 10.

Once configured for the head-to-head mode of play, a new gaming session is initiated or invoked on the gaming modules 900_a_, 900_b_ (918_d_). The players can also choose other options for a head-to-head game. For example, Player 1 may choose the game to be played (e.g., a "Zeus"-themed wagering game including arrays of reels). As another example, Player 1 could choose the number of plays in a tournament (e.g., 30 plays, 40 plays, etc.). The wagering games are displayed on video displays 914_a_, 914_b_. Player 1 and Player 2 play the same game independently on gaming modules 900_a_, 900_b_. Each player plays a predetermined number of plays, for example spins (e.g., 40 spins). For example, Player 1 makes a wager for the current play (928_d_). Player 1 initiates a play (e.g., a spin of the reels) to generate an outcome (e.g., by pressing initiate spin button 906_a_) (930_d_). Based on the outcome, Player 1 may be awarded an award, e.g., a number of credits (932_d_), which are added to Player 1's total and displayed on Player 1's credit meter 902_a_. The software tracks and increments the number of spins by one (934_d_). The algorithm 910_d_ compares the tracked number of spins to the predetermined number of spins (936_d_). If the tracked number of spins is less than the predetermined number of spins, steps 928_d_, 930_d_, 932_d_, 934_d_, and 936_d_ are repeated. Concurrently, Player 2 iteratively wagers and spins the reels; awards may be awarded based on the outcome of the spins; and the software tracks the spins and compares them to the predetermined number of spins (928_d_, 930_d_, 932_d_, 934_d_, and 936_d_). Accumulated credits are displayed to Player 2 on credit meter 902_b_.

During the iterations, for example before either party initiates his or her first play, the players may have the option of making a side wager (940_d_). For example, the side wager can be a wager that the other player will obtain the most credits by the end of the session. The side wager can be a multiple or a fraction of the player's wager for a play. The fraction can be, for example, 50%. Thus, if Player 2 wagers 500 credits, and has made a side wager, Player 2's wager is increased by 50% to 750 credits. When a player makes a side bet before making his or first spin (940_d_), the multiple or fraction is added to that player's wagers for each spin.

Once both players have completed the predetermined number of spins, the algorithm 910_d_ compares the number of credits accumulated by Player 1 to the number of credits accumulated by Player 2 to determine which player has the most credits (938_d_). If the players were given the option of making a side wager, the algorithm 910_d_ determines whether the player with fewer credits has made a side wager (942_d_). If the player with fewer credits did not make a side wager, or no side wager option was given, the player with the most credits is awarded the sum of the credits accumulated by both players (944_d_). If permitted, and the player with fewer credits has made a side wager, the player with fewer credits is awarded the credits in his or her credit meter (946_d_) and the player with the most credits is awarded the sum of the credits accumulated by both players (944_d_). Alternatively, other awards can be awarded to the winning player. For example, the winning player could be awarded a multiple of the credits in his credit meter (for example 2×). Or the award could be based on information stored in a pay table, for example a player winning a 100 game tournament may be awarded 100 times his or her wager. Additionally, a smaller award could be awarded to the player who finishes second, either with a side wager or without.

Figure 13A:
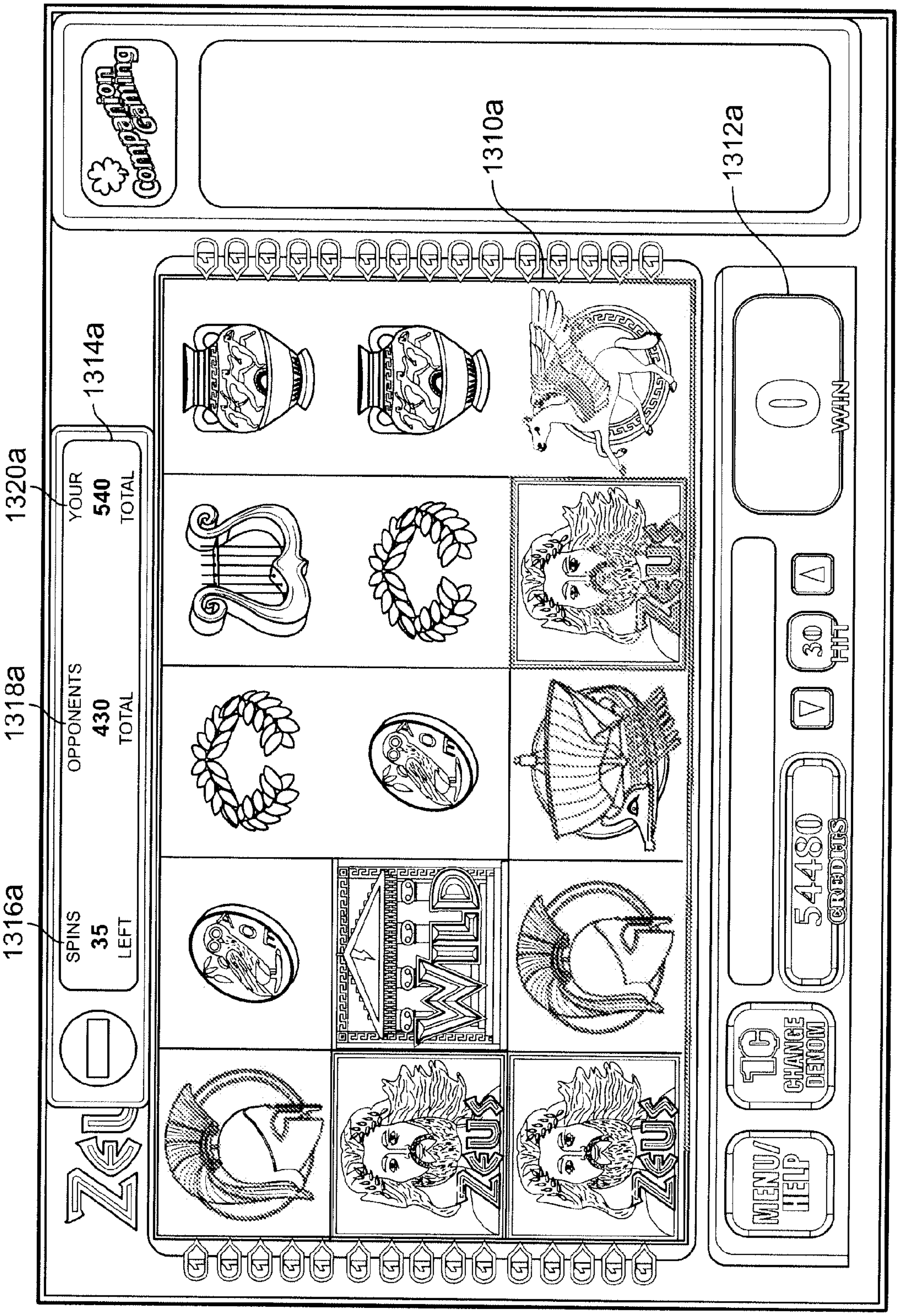
FIGS. 13*a* and 13*b* illustrate an exemplary multi-player head-to-head wagering game.
Figure 13B:
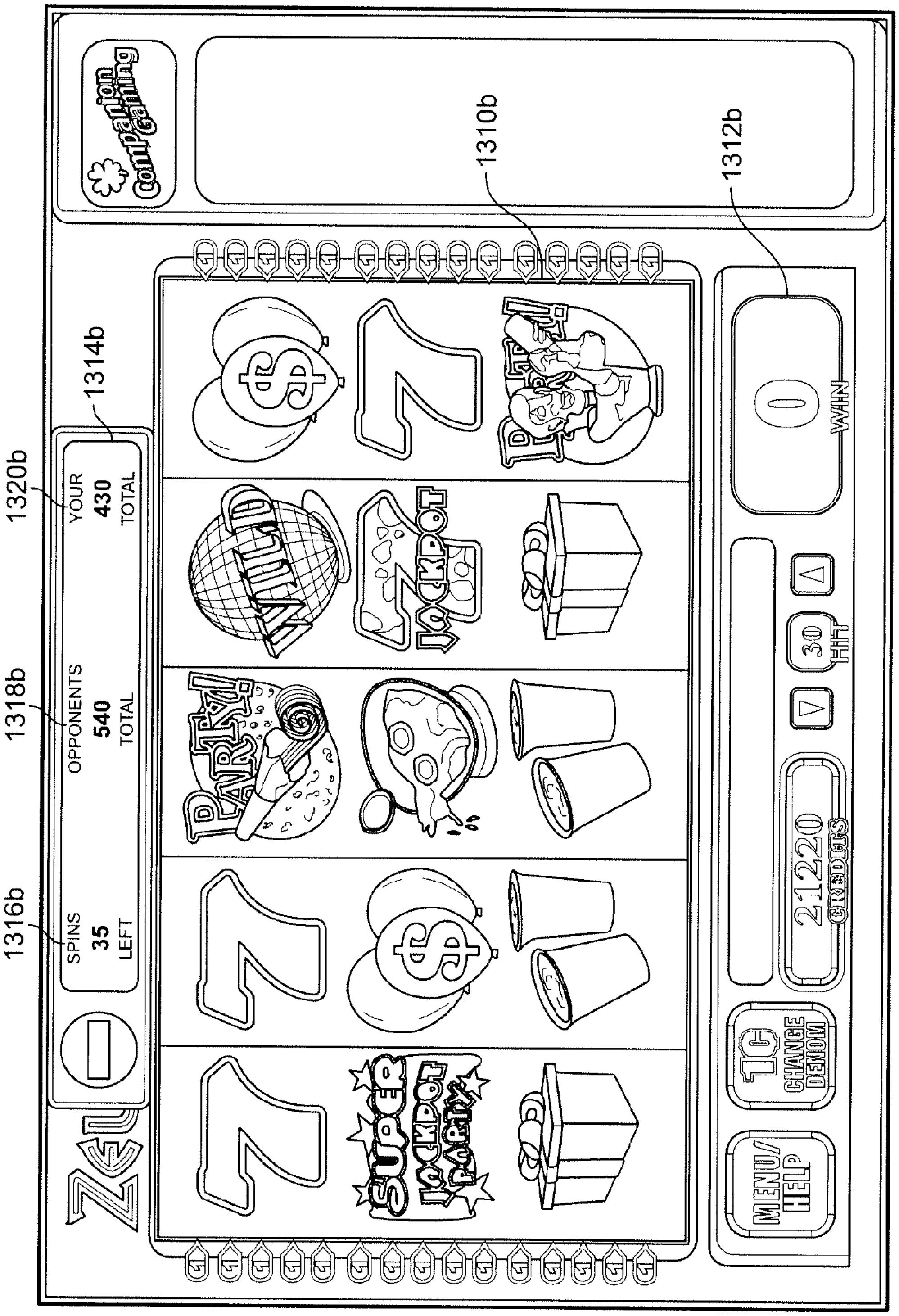

FIG. 13_a_ and FIG. 13_b_ show an example of the content displayed on displays 914_a_, 914_b_ during a "head-to-head" session. Each player is presented with separate game symbols 1310_a_, 1310_b_. Each player is also presented with his or her own winnings, credits, etc. 1312_a_, 1312_b_. A message portion 1314_a_, 1314_b_ of the displays 914_a_, 914_b_ can be configured to indicate information to each of the players, such as the number of spins that player has left 1316_a_, 1316_b_, the opponent's total winnings in the session 1318*a*, 1318*b*, and the player's total winnings in the session 1320*a*, 1320*b*.

Promoting friendly competition among players enhances the excitement of the gaming experience. For example, because an award to Player 1 depends upon the outcome of Player 2's game, Player 1 can be emotionally involved in Player 2's outcomes. However, rather than rooting for Player 2 to be unsuccessful, Player 1 may desire Player 2 to win as many credits as possible short of Player 1's own total credits in order to maximize Player 1's award. Moreover, structuring the gaming session as a tournament with a predetermined number of spins encourages the players to become invested in the outcomes of later spins, resulting in a longer playing session, and more coin in, for both players.

Although specific aspects are disclosed with reference to various of the Figures, it should be understood that any aspect disclosed with reference to a specific Figure may be combined with or incorporated into any other aspect associated with any other Figure herein. The wagering games shown in FIGS. 3-13*b* may represent primary wagering games, bonus games, or both. Any of the wagering games disclosed herein may be played on the gaming machine 10 shown in FIG. 1*a*, the handheld or mobile gaming machine 110 shown in FIG. 1*b*, or on any multi-player gaming machine such as the gaming machine 310 shown in FIG. 3. The button panel 570 shown in FIG. 5*a* may be incorporated into any of such gaming machines The graphical images shown in FIGS. 3-13*b* are merely exemplary, and are not intended to illustrate every or the only aspects of the inventions disclosed herein. It should be understood that the game software and associated audiovisual content for the wagering games disclosed herein may be stored in any of the gaming machines disclosed herein or remotely on a host computer, which may be streamed or downloaded to any of the gaming machines disclosed herein.

Players of any of the wagering games disclosed herein may have separate credit meters or they may share a shared credit meter in which all credits are credited or debited from the shared credit meter regardless of which player is playing the wagering game. The exemplary graphic shown in FIG. 5*b* may be displayed on any of the wagering games disclosed herein for receiving an input from a player as to how to allocate a number of credits. When players opt to split credits between themselves (530*c*), they may allocate the credits according to any range from between 0 and 100%. Alternately, credits may be automatically allocated in a manner commensurate with the respective wagers received from each of the players. If Player A inputs twice the number of credits as Player B, Player A's credit meter receives twice the number of credits as Player B. Likewise, if Player A and Player B receive an award, for example in response to mutually achieving a common accomplishment, Player A's credit meter may be incremented with twice the number of credits associated with the award than Player B's credit meter.

Each of these embodiments and obvious variations thereof is contemplated as falling within the spirit and scope of the claimed invention, which is set forth in the following claims.

What is claimed is:

1. A companion wagering game method in which a first player and a second player cooperatively play a first wagering game and a second wagering game, comprising:

receiving at a first gaming module, via one or more input devices of the first gaming module, a first wager from the first player;

receiving at a second gaming module, via one or more input devices of the second gaming module, a second wager from the second player;

configuring the first gaming module and the second gaming module for a best-outcome mode, the first gaming module and the second gaming module being linked to allow communication of information between the first gaming module and the second gaming module;

displaying the first wagering game at the first gaming module and the second wagering game at the second gaming module;

randomly selecting, via one or more processors, a first game outcome from a plurality of game outcomes associated with the first wagering game and a second game outcome from a plurality of game outcomes associated with the second wagering game;

initiating play of the first wagering game by the first player at the first gaming module to display the first outcome;

initiating play of the second wagering game at the second gaming module to display the second outcome;

selecting, via at least one of the one or more processors, a best outcome between the first and second game outcomes by comparing the first game outcome to the second game outcome so as to select the best outcome as having a highest expected value;

responsive to the best outcome being a winning outcome, awarding a first award based on both the first wager and the best outcome to the first player and a second award based on both the second wager and the best outcome to the second player; and responsive to the best outcome being a bonus trigger, awarding a bonus to both the first player and the second player.

2. The method of claim 1, wherein the awarding the bonus comprises alternately receiving a first bonus selection and a second bonus selection from the first and second players at the first and second gaming modules, respectively.

3. The method of claim 2, wherein the alternately receiving a first bonus selection and a second bonus selection occurs until at least one of the first bonus selection and the second bonus selection includes a stopper symbol.

4. The method of claim 1, wherein the awarding the bonus comprises:

initiating play of a first bonus game for the first player to display a first bonus outcome;

initiating play of a second bonus game for the second player to display a second bonus outcome;

selecting a best bonus outcome between the first and second bonus game outcomes; and awarding a bonus award to both the first player and the second player related to the best bonus outcome.

5. The method of claim 1, wherein the awarding the bonus comprises awarding a common bonus award to both the first player and the second player.

6. The method of claim 1, further comprising providing a multi-player seating configuration, such that the first player and the second player are seated side-by-side in front of the first gaming module and the second gaming module.

7. The method of claim 6, wherein the multi-player seating configuration includes a double-wide chair.

8. The method of claim 1, further comprising indicating to both players which outcome of the first outcome and the second outcome is associated with the bonus.

9. The method of claim 1, wherein the initiating play of the second wagering game is at the same time as the initiating play of the first wagering game.

10. The method of claim 1, further comprising:

receiving a first player input on the first gaming module indicative of a selection by the first player to initiate the best-outcome mode; and receiving a second player input on the second gaming module indicative of a selection by the second player to initiate the best-outcome mode, wherein the configuring the first gaming module and the second gaming module for the best-outcome mode is responsive to the receiving the first player input and the receiving the second player input.

11. The method of claim 1, further comprising prompting the second player at the second gaming module to join the best-outcome mode.

12. The method of claim 1, further comprising displaying a first credit meter at the first gaming module and displaying a second credit meter at the second gaming module.

13. The method of claim 12, wherein the first credit meter and the second credit meter provide an indication of credits shared by the first player and the second player.

14. The method of claim 1, further comprising presenting an option to transfer credits from the first player to the second player.

15. The method of claim 1, wherein the first outcome is displayed on a first primary display of the first gaming module and the second outcome is displayed on a second primary display of the second gaming module.

16. The method of claim 15, wherein the awarding the bonus includes displaying a common bonus game on a secondary display.

17. The method of claim 1, wherein the first gaming module and the second gaming module are separate gaming machines.

18. The method of claim 1, wherein the first wagering game is displayed on a first display device and the second wagering game is displayed on a second display device, the first display device being different from the second display device.

19. A companion wagering game method in which a first player and a second player cooperatively play a first wagering game and a second wagering game, comprising:

receiving at a first gaming module, via one or more input devices of the first gaming module, a first wager from the first player;

receiving at a second gaming module, via one or more input devices of the second gaming module, a second wager from the second player;

configuring the first gaming module and the second gaming module for a best-outcome mode, the first gaming module and the second gaming module being linked to allow communication of information between the first gaming module and the second gaming module;

displaying the first wagering game at the first gaming module and the second wagering game at the second gaming module;

randomly selecting, via one or more processors, a first game outcome from a plurality of game outcomes associated with the first wagering game and a second game outcome from a plurality of game outcomes associated with the second wagering game;

initiating play of the first wagering game by the first player at the first gaming module to display the first outcome;

initiating play of the second wagering game at the second gaming module to display the second outcome;

selecting, via at least one of the one or more processors, a best outcome between the first and second game outcomes by comparing the first game outcome to the second game outcome so as to select the best outcome as having a highest expected value; and responsive to the best outcome being a winning outcome, awarding a first award based on both the first wager and the best outcome to the first player and a second award based on both the second wager and the best outcome to the second player.

20. The method of claim 19, wherein the initiating play of the second wagering game is at the same time as the initiating play of the first wagering game.

21. The method of claim 19, further comprising providing a multi-player seating configuration, such that the first player and the second player are seated side-by-side in front of the first gaming module and the second gaming module.

22. The method of claim 19, further comprising prompting the second player at the second gaming module to join the best-outcome mode.

23. The method of claim 19, wherein the first gaming module and the second gaming module are separate gaming machines.

24. The method of claim 19, wherein the first wagering game is displayed on a first display device and the second wagering game is displayed on a second display device, the first display device being different from the second display device.

25. A gaming system in which a first player and a second player cooperatively play a first wagering game and a second wagering game, comprising:

a first gaming module including a first display;

a second gaming module including a second display, the second display being adjacent to the first display, the first gaming module and the second gaming module being linked to allow communication of information between the first gaming module and the second gaming module;

one or more input devices;

one or more processors;

one or more memory devices storing instructions that, when executed by the one or more processors, cause the gaming system to:

receive at the first gaming module a first wager from the first player;

receive at the second gaming module a second wager from the second player;

configure the first gaming module and the second gaming module for a best-outcome mode;

display the first wagering game on the first display and the second wagering game on the second display;

randomly select a first game outcome from a plurality of game outcomes associated with the first wagering game and a second game outcome from a plurality of game outcomes associated with the second wagering game;

initiate play of the first wagering game by the first player at the first gaming module to display the first outcome;

initiate play of the second wagering game at the second gaming module to display the second outcome;

select a best outcome between the first and second game outcomes by comparing the first game outcome to the second game outcome so as to select the best outcome as having a highest expected value;

responsive to the best outcome being a winning outcome, award a first award based on both the first wager and the best outcome to the first player and a second award based on both the second wager and the best outcome to the second player.

26. The system of claim 25, further comprising a double-wide chair configured to permit the first player and the second player to be seated side-by-side in front of the first gaming module and the second gaming module.

27. The system of claim 26, further comprising a first chair and a second chair, the first chair being in front of the first display and adjacent to the second chair, the second chair being in front of the second display.

28. The system of claim 25, further comprising a secondary display positioned above the first display and the second display.

29. The system of claim 25, wherein the one or more input devices are configured to accept inputs relating to initiation of the best-outcome mode.

30. The system of claim 25, further comprising a first credit meter displayed on the first display and a second credit meter displayed on the second display.

31. The system of claim 30, wherein the first credit meter and the second credit meter provide an indication of credits shared by the first player and the second player.

32. The system of claim 25, wherein the one or more memory devices further store instructions that, when executed by the one or more processors, cause the gaming system to initiate the play of the second wagering game and initiate the play of the first wagering game simultaneously.

33. The system of claim 25, wherein the one or more memory devices further store instructions that, when executed by the one or more processors, cause the gaming system to, responsive to the best outcome being a bonus trigger, award a bonus to both the first player and the second player.

34. The system of claim 33, wherein the instructions that cause the gaming system to award the bonus include instructions that cause the system to alternately receive a first bonus selection and a second bonus selection from the first and second players at the first and second gaming modules, respectively.

35. The system of claim 33, wherein the instructions that cause the gaming system to award the bonus include instructions that cause the system to:

initiate play of a first bonus game for the first player to display a first bonus outcome;

initiate play of a second bonus game for the second player to display a second bonus outcome;

select a best bonus outcome between the first and second bonus game outcomes; and award a bonus award to both the first player and the second player related to the best bonus outcome.

36. The system of claim 33, wherein the instructions that cause the gaming system to award the bonus include instructions that cause the system to award a common bonus award to both the first player and the second player.

37. The system of claim 33, wherein the one or more memory devices further store instructions that, when executed by the one or more processors, cause the gaming system to indicate to both players which outcome of the first outcome and the second outcome is associated with the bonus.

38. The system of claim 25, wherein the first gaming module and the second gaming module are separate gaming machines.

* * * * *